(12) United States Patent
Bean et al.

(10) Patent No.: US 10,808,510 B2
(45) Date of Patent: Oct. 20, 2020

(54) ENVIRONMENTALLY FRIENDLY, RELIABLE, SCALABLE, AND EFFICIENT MICRO-TURBINE ELECTRIC GENERATOR SYSTEM

(71) Applicant: REVOLUTION Turbine Technologies, LLC, Asheville, NC (US)

(72) Inventors: Christopher Bean, Canton, NC (US); James Stuart Grasty, Jr., Canton, NC (US); David L. Schauer, New Ulm, MN (US); Blaine E. Alderks, St. Peter, MN (US)

(73) Assignee: REVOLUTION TURBINE TECHNOLOGIES, LLC, Asheville, NC (US)

( * ) Notice: Subject to any disclaimer, the term of this patent is extended or adjusted under 35 U.S.C. 154(b) by 0 days.

(21) Appl. No.: 16/513,674

(22) Filed: Jul. 16, 2019

(65) Prior Publication Data
US 2020/0032629 A1 Jan. 30, 2020

Related U.S. Application Data

(60) Provisional application No. 62/699,803, filed on Jul. 18, 2018.

(51) Int. Cl.
*E21B 43/12* (2006.01)
*F01D 15/10* (2006.01)
*H02K 7/18* (2006.01)

(52) U.S. Cl.
CPC .......... *E21B 43/126* (2013.01); *E21B 43/122* (2013.01); *F01D 15/10* (2013.01);
(Continued)

(58) Field of Classification Search
CPC ...... E21B 43/126; E21B 43/122; F01D 15/10; H02K 7/1823
See application file for complete search history.

(56) References Cited

U.S. PATENT DOCUMENTS 3,039,007 A    6/1962   Williams et al.
4,276,482 A *  6/1981   Crockett ................. F03B 13/10
                                              290/52

(Continued)

OTHER PUBLICATIONS

"International Search Report and Written Opinion Issued in PCT Application No. PCT/US19/42288," dated Oct. 31, 2019, 7 pages.

*Primary Examiner* — Viet P Nguyen
(74) *Attorney, Agent, or Firm* — Newport IP, LLC; Leonard J. Hope

(57) ABSTRACT

A power generation system includes one or more micro-turbine electric generators ("MTEGs"). The MTEGs include a housing having an inlet for receiving pressurized gas and an outlet for releasing expanded gas. The MTEGs also include a rotor, a user-replaceable nozzle for directing pressurized gas over blades of the rotor, and a stator for generating alternating current ("AC") responsive to rotation of the rotor. The power generation system also includes a programmable logic controller ("PLC") coupled to the MTEGs that operates flow control valves ("FCVs") coupled to the MTEGs to modulate the flow of gas to the MTEGs to generate output power suitable to support an electrical load. The system also includes power conversion circuitry configured to convert AC generated by the MTEGs to direct current ("DC") and to provide the DC to an electrical load. The system also includes a skid for mounting multiple and MTEGs and FCVs.

17 Claims, 22 Drawing Sheets

(52) U.S. Cl.
CPC ..... *H02K 7/1823* (2013.01); *F05D 2220/764* (2013.01); *F05D 2250/82* (2013.01); *F05D 2270/50* (2013.01)

(56) References Cited

U.S. PATENT DOCUMENTS

| | | | | |
|---|---|---|---|---|
| 4,687,054 | A * | 8/1987 | Russell | E21B 43/00 |
| | | | | 166/105 |
| 6,494,043 | B1 | 12/2002 | Choroszylow et al. | |
| 6,747,372 | B2 | 7/2004 | Gilbreth et al. | |
| 7,468,564 | B2 * | 12/2008 | Crisafulli | H02K 7/1823 |
| | | | | 290/43 |
| 8,621,856 | B2 * | 1/2014 | Burt | F04B 49/065 |
| | | | | 60/398 |
| 2003/0131986 | A1 * | 7/2003 | Schultz | E21B 41/0085 |
| | | | | 166/66.5 |
| 2012/0056436 | A1 * | 3/2012 | Russell | F02D 29/06 |
| | | | | 290/40 B |
| 2012/0112465 | A1 * | 5/2012 | Morrison | F03D 9/25 |
| | | | | 290/55 |
| 2012/0139250 | A1 * | 6/2012 | Inman | E21B 21/10 |
| | | | | 290/52 |
| 2014/0265326 | A1 | 9/2014 | Allen | |
| 2015/0008670 | A1 * | 1/2015 | Furman | F23N 5/242 |
| | | | | 290/43 |
| 2015/0194860 | A1 * | 7/2015 | Caliz | H02K 7/1823 |
| | | | | 290/52 |

\* cited by examiner

ENVIRONMENTALLY FRIENDLY, RELIABLE, SCALABLE, AND EFFICIENT MICRO-TURBINE ELECTRIC GENERATOR SYSTEM

CROSS-REFERENCE TO RELATED APPLICATIONS

This application claims priority to U.S. Provisional Patent Application No. 62/699,803, entitled "ENVIRONMENTALLY FRIENDLY, RELIABLE, SCALABLE, AND EFFICIENT MICRO-TURBINE ELECTRIC GENERATOR SYSTEM," which was filed on Jul. 18, 2018, and which is expressly incorporated herein by reference in its entirety.

BACKGROUND

The need for additional oil, gas and other mineral resources has in recent years brought about increased activity in the exploration for and the recovery of such resources from offshore locations. At locations having substantial oil and gas reserves, one approach taken in recovering the minerals has been to erect a permanent platform at the proposed well site and lay pipelines between the platform and the shore to transport the oil and gas to onshore storage or processing facilities.

In erecting a permanent platform, an understructure is brought to the offshore location by transporting the structure to the well site on floats, or on its own buoyancy. Once the structure is on location, it is made to sink or is lowered to the bottom of the ocean and anchored there by pilings driven into the ocean floor. The remaining portion of the permanent platform is erected on top of the understructure, which remaining portion might be a drilling derrick or a production facility, or both. In many installations, along with the construction of a permanent platform, there will be a simultaneous laying of one or more underwater pipelines to a shore-side storage terminal.

Offshore platforms, such as those described above, commonly have lights, communications equipment, and other types of devices that require electrical power. In the past, electrical devices on offshore platforms have commonly been powered by solar power installations or combustion engines that burn waste gases that would otherwise be flared or released directly into the atmosphere. These solutions, however, have significant drawbacks that make their use on offshore platforms complex and undesirable.

Combustion engines burn waste gases and, therefore, release greenhouse gases that are harmful to the environment. These devices can also be very unreliable due to the large number of moving parts and high temperatures generated. As a result, combustion engines can require a significant amount of maintenance. Because offshore platforms are commonly unmanned, a technician frequently must be transported to an offshore platform to repair or perform maintenance on combustion engines. It is, however, very costly to send technicians to offshore platforms to perform repairs or maintenance, commonly requiring the use of a helicopter. Additionally, such combustion engines are very large and heavy and, therefore, can be difficult to install on offshore platforms where space is very limited.

Solar power solves some of the drawbacks of combustion engines but introduces some of its own challenges. In particular, solar panels require a large amount of space, which is commonly unavailable on offshore platforms. Moreover, if additional power generation capacity is needed, the limited amount of space on offshore platforms can make it difficult to install additional solar panels. The limited amount of space on offshore platforms can also make it difficult to scale combustion solutions to provide additional power.

New technologies for extracting oil and gas, commonly referred to as "enhanced oil or gas recovery," can extend the service life of offshore platforms. These technologies, however, can require additional power beyond that commonly generated on offshore platforms using existing solar and combustion technologies. In view of the significant limitations of combustion and solar power generation on offshore platforms, existing power-generation technologies can be unsuitable for use in powering offshore platforms that implement enhanced oil or gas recovery.

Other types of remote locations where landline power is not readily available also have a need for power. For example, remote pipelines frequently need electricity to power monitoring and communications equipment. As in the case of oil platforms, solar panels and combustion engines are commonly used to provide power at these locations. These technologies, however, suffer from the drawbacks described above and potentially others.

It is with respect to these and other technical challenges that the disclosure made herein is presented.

SUMMARY

An environmentally friendly, reliable, scalable, and efficient micro-turbine electric generator ("MTEG") system is disclosed herein. The disclosed MTEG system utilizes lift gas (or "gaslift") on an offshore oil platform, or another type of gas, to generate power without combustion and without releasing gas into the environment. As a result, the disclosed MTEG system is environmentally friendly as compared to previous combustion systems that burn gas to generate power for use on offshore platforms. Additionally, the disclosed MTEG system includes various features that make it easier to maintain than previous combustion power-generation techniques, thereby reducing the need to transport technicians to offshore platforms where the disclosed MTEG system is installed.

The disclosed MTEG system can also be scaled to generate additional power to support advanced oil and gas recovery technologies or other components in a manner that requires minimal space which, as mentioned above, can be very limited on offshore platforms. The disclosed technologies can also be utilized in other types of remote locations, such as remote pipelines, where pressurized gas is present. Other technical benefits not specifically mentioned herein can also be realized through implementations of the disclosed subject matter.

In order to realize the technical benefits mentioned briefly above, and potentially others, a power generation system includes one or more MTEGs. The MTEGs include a sealed metallic housing having an inlet for receiving pressurized gas and an outlet for releasing expanded gas. The MTEGs also include a rotor, a user-replaceable nozzle for directing pressurized gas over blades of the rotor, and a stator for generating alternating current ("AC") responsive to rotation of the rotor.

The power generation system also includes a programmable logic controller ("PLC") or another type of computing device coupled to the MTEGs that operates flow control valves ("FCVs") also coupled to the MTEGs to modulate the flow of gas to the MTEGs to generate output power suitable to support an electrical load. The disclosed system also includes power conversion circuitry configured to convert AC generated by the MTEGs to direct current ("DC") and to provide the DC to an electrical load. The system can also include frame, which might be referred to herein as a "skid," for mounting multiple and MTEGs, FCVs, and a PLC or other type of computing device in some configurations. These and various other features will be apparent from a reading of the following Detailed Description and a review of the associated drawings.

As discussed briefly above, implementations of the technologies disclosed herein can provide clean power, reliable operation, and scalability not found in previous technologies for generating power for use by on offshore platforms or other remote locations where landline power is not available. Other technical benefits not specifically mentioned herein can also be realized through implementations of the disclosed technologies.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order that the disclosed technologies may be understood in detail, a more particular description of the disclosed technologies is made by reference to specific embodiments thereof which are illustrated in the appended drawings and described in the following detailed description. In the drawings.

DETAILED DESCRIPTION

Figure 1:
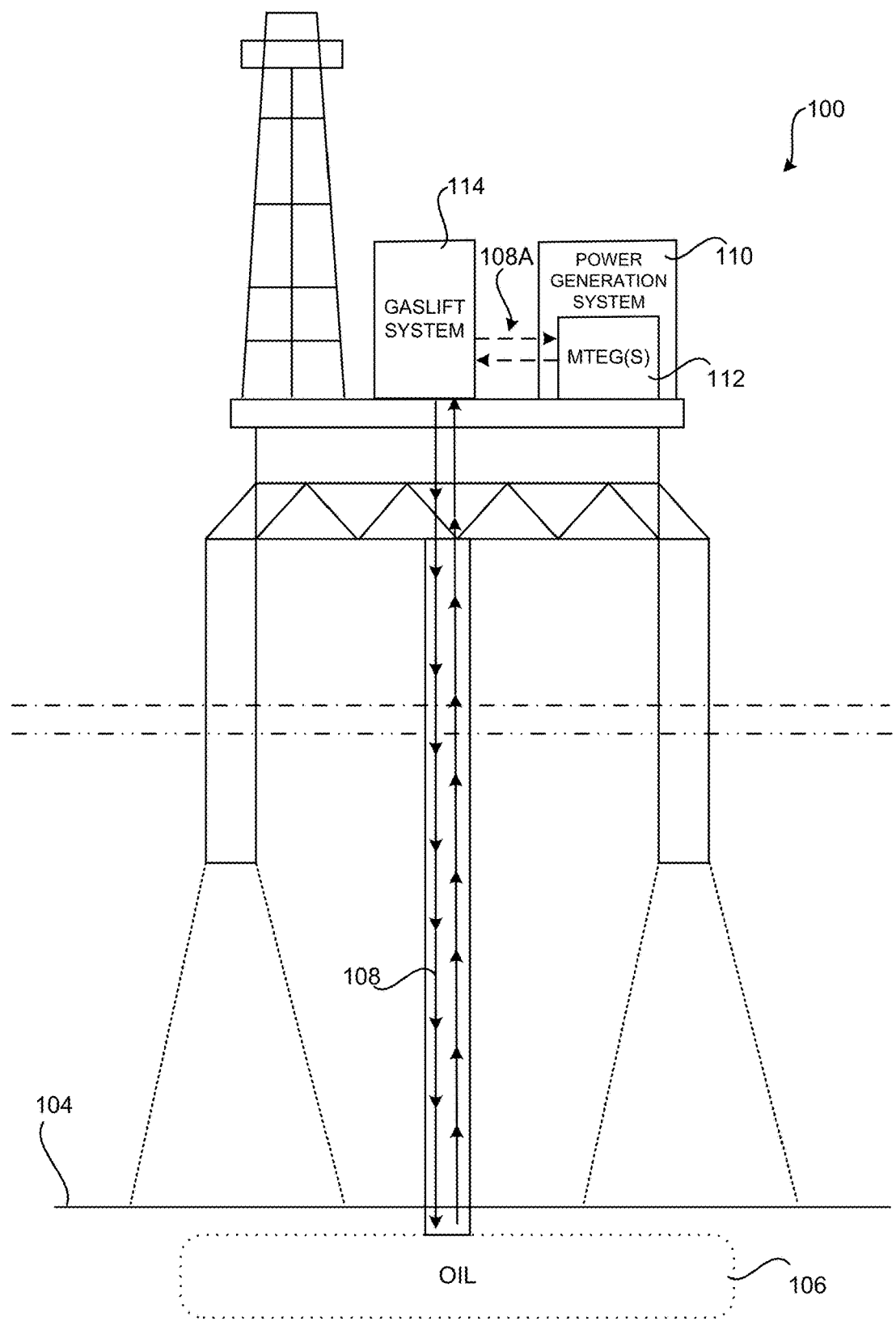
FIG. 1 is an elevated view of a typical offshore fixed oil and gas platform.

The following detailed description is directed to an environmentally friendly, reliable, and scalable micro-turbine electric generator MTEG system. As discussed briefly above, the disclosed MTEG system does not combust gas and, therefore, is more environmentally friendly than combustion-based power generation systems. Additionally, the disclosed MTEG system is easier to maintain than previous combustion power-generation systems, thereby reducing the need to transport technicians to offshore platforms to perform repairs. The disclosed MTEG system can also be easily scaled to generate additional power to support advanced technologies or other components in a manner that requires minimal space. Other technical benefits not specifically mentioned herein can also be realized through implementations of the disclosed subject matter.

While the subject matter described herein is presented in the general context of an offshore oil and gas platform, those skilled in the art will also appreciate that the subject matter described herein can be practiced in other environments where suitable gas is available. For example, and without limitation, the disclosed power generation system and MTEG might be utilized to generate power in conjunction with a land-based gas pipeline or any other location where pressurized gas is available. Additionally, various types of gas other than natural gas can also be utilized with the technologies disclosed herein such as, but not limited to, methane and compressed air.

In the following detailed description, references are made to the accompanying drawings that form a part hereof, and which are shown by way of illustration specific configurations or examples. Referring now to the drawings, in which like numerals represent like elements throughout the several FIGS., aspects of a MTEG system will be described.

As discussed above, the need for additional oil, gas and other mineral resources has in recent years brought about increased activity in the exploration for and the recovery of such resources from offshore locations. At locations having substantial oil and gas reserves, the approach taken in recovering the minerals has been to erect a platform, such as the platform 100 shown in FIG. 1, at the offshore well site.

Well fluids, such as oil 106 and/or gas, which are produced from one or more subsea wells or other sources are transferred to the deck of the platform 100 via a number of riser pipes. The produced fluids can be processed by processing facilities located on the deck of the platform 100, and the resulting oil 106 and/or gas is then typically transported to an on-shore refinery via a pipeline, a shuttle tanker or other conventional means (not shown). The drilling, production and storage equipment, together with the living quarters of personnel, if any, are integrated into such a platform 100.

In general, offshore platforms such as that shown in FIG. 1 fall into one of two groups: fixed platforms and floating platforms. Fixed platforms include a "topside," or equipment deck, that is supported above the water by legs that extend down to and are seated, directly or indirectly, on the sea floor 104. While relatively stable, such fixed platforms are typically limited to shallow waters, i.e., depths of about 500 feet (150 m) or less.

Floating platforms, such as the platform 100 shown in FIG. 1, are typically employed in water depths of 500 ft. (154 m) and greater and are held in position over the well site by mooring lines or chains anchored to the sea floor 104, or by motorized thrusters located on the sides of the platform 100, or by both. Although floating platforms are more complex to operate because of their greater movement in response to wind and wave conditions, they are capable of operating at substantially greater depths than fixed platforms, and are also more mobile, and hence, easier to move to other offshore well sites. The technologies disclosed herein can be utilized with fixed and floating platforms (and in other locations where pressurized gas is available).

In some installations, platforms 100 also include a gaslift system 114 to optimize the oil recovery process. As shown in FIG. 1, the gaslift system pumps compressed gas 108 into a well. When the gas 108 returns to the platform 100 from the well, it lifts oil 106 and gas to the platform 100 for recovery. The returned gas can then be cleaned, dried, and processed in other ways and returned to the gaslift system 114 for further use in a similar manner. The gaslift system 114 can include many components, which have not been shown in FIG. 1 for simplicity of discussion.

As also described above, offshore platforms have lights, communications equipment, and other types of devices that require electrical power. In the past, electrical devices on offshore platforms have commonly been powered by solar power installations or combustion engines that burn waste gases that would otherwise be flared or released directly into the atmosphere. These solutions, however, have significant drawbacks that make their use on offshore platforms complex and undesirable, some of which were described above.

In order to address the shortcomings of previous offshore power-generation solutions, a power generation system 110 is provided herein that is configured for use on a platform 100 (or in another location where pressurized gas is available). As shown in FIG. 1, the power generation system 110 (which might be referred to as a "MTEG system 100") includes one or more MTEGs 112. In order to operate the MTEGs 112 (which might be referred to herein singularly as an MTEG 112 or collectively as the MTEGs 112), a portion of the lift gas 108 (labeled in FIG. 1 as lift gas 108A) produced as a byproduct to the production of oil 106 at well sites such as those described above can be diverted to the MTEGs 112.

As will be described in greater detail below, the lift gas 108A can be fed to an inlet on the MTEGs 112. As will also be described in greater detail below, the lift gas 108A input to the MTEGs 112 expands across a rotor (not shown in FIG. 1), thereby spinning the rotor at a high velocity and generating power by way of an integrated stator. The expanded natural gas can then be returned from the MTEGs 112 to the gaslift system 114 for continued use in the manner described above.

Because the lift gas 108A is not combusted as in previous solutions or vented, the MTEGs 112 can generate power with no negative environmental impact. Additionally, because the MTEGs 112 are sealed with no bearings exposed to the lift gas 108A, the MTEGs 112 are highly reliable, thereby decreasing maintenance costs associated with previous power generation solutions. As will be described in greater detail below, the power generation system 110 is highly scalable through the use of multiple MTEGs 112. MTEGs 112 can be added to the power generation system 110 to generate additional power as required.

The specific illustrative configuration of the MTEGs 112 disclosed herein can generate up to 1.4 kW of power. Moreover, utilizing the MTEG system 110 disclosed herein, multiple MTEGs 112 can be easily combined in a small space, thereby enabling the generation of significant additional power (e.g. 4 MTEGs can generate up to 5.6 kW of power). The electrical output of an MTEG 112 can also be controlled by modifying the amount of natural gas 108 flowing to the MTEG 112, thereby modifying the RPM of the rotor. As a result, each MTEG 112 can generate between 700 w to 1.4 kW of power without modification. Moreover, minor component changes to the MTEGs 112 can enable each MTEG 112 to generate up to 3 kW. Details regarding these aspects of the MTEG 112, and others, will be provided below with regard to FIGS. 2-19.

Figure 2:
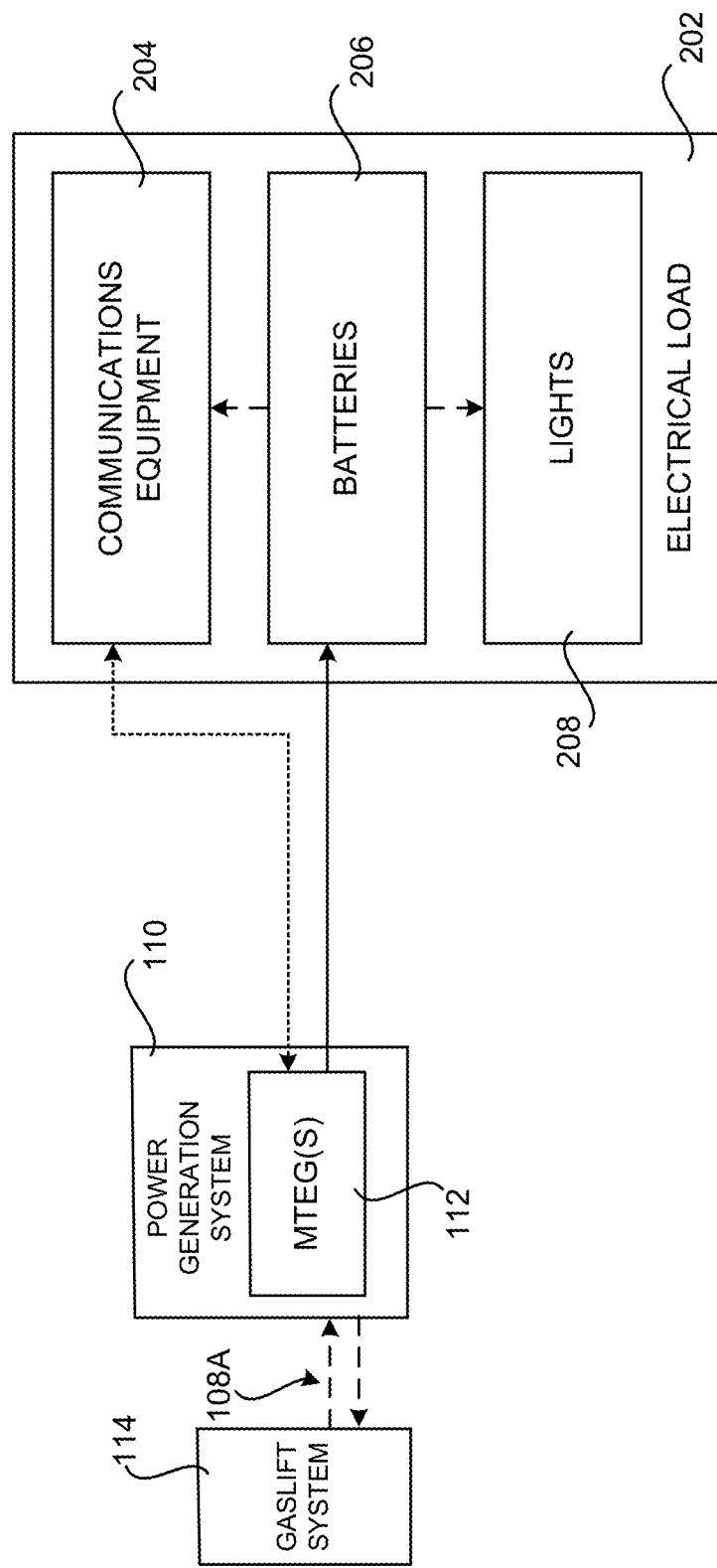
FIG. 2 is a system diagram showing an overview of an MTEG-based power generation system disclosed herein, along with aspects of a typical electrical load found on an offshore platform.

FIG. 2 is a system diagram showing additional aspects of an MTEG-based power generation system 110 disclosed herein along with aspects of a typical electrical load 202 found on an offshore platform 100 and in other remote installations such as oil pipelines. As shown in FIG. 2 and described briefly above, an offshore platform 100 includes an electrical load 202. The electrical load 202 can include communications equipment 204, lights 208, automation equipment (not shown), and other types of electrical devices.

In order to power the electrical load 202, the MTEGs 112 generate alternating current ("AC") in some configurations. As discussed above, power is generated by diverting gas 108A from a gaslift system 114 in some configurations in order to spin a rotor in the MTEGs 112. In other installations, the gas 108A is diverted from a gas pipeline and used in a similar manner. The gas 108A is then returned to the gaslift system 114 or pipeline. In this way, the MTEGs can generate power for the electrical load 202 with no environmental impact.

Components within the power generation system 110, which will be described in detail below, convert the AC to direct current ("DC") that is used to power the electrical load 202 in some configurations. The electrical load 202 can be powered directly by the power generation system 110 or, in some configurations, power generated by the power generation system 110 can be utilized to charge batteries 206. In turn, the batteries 206 can be used to power the communications equipment 204, the lights 208, and the other components of the electrical load 202. Additional details regarding the electrical configuration of the MTEG system 110 will be described below with regard to FIGS. 3-5.

Figure 3:
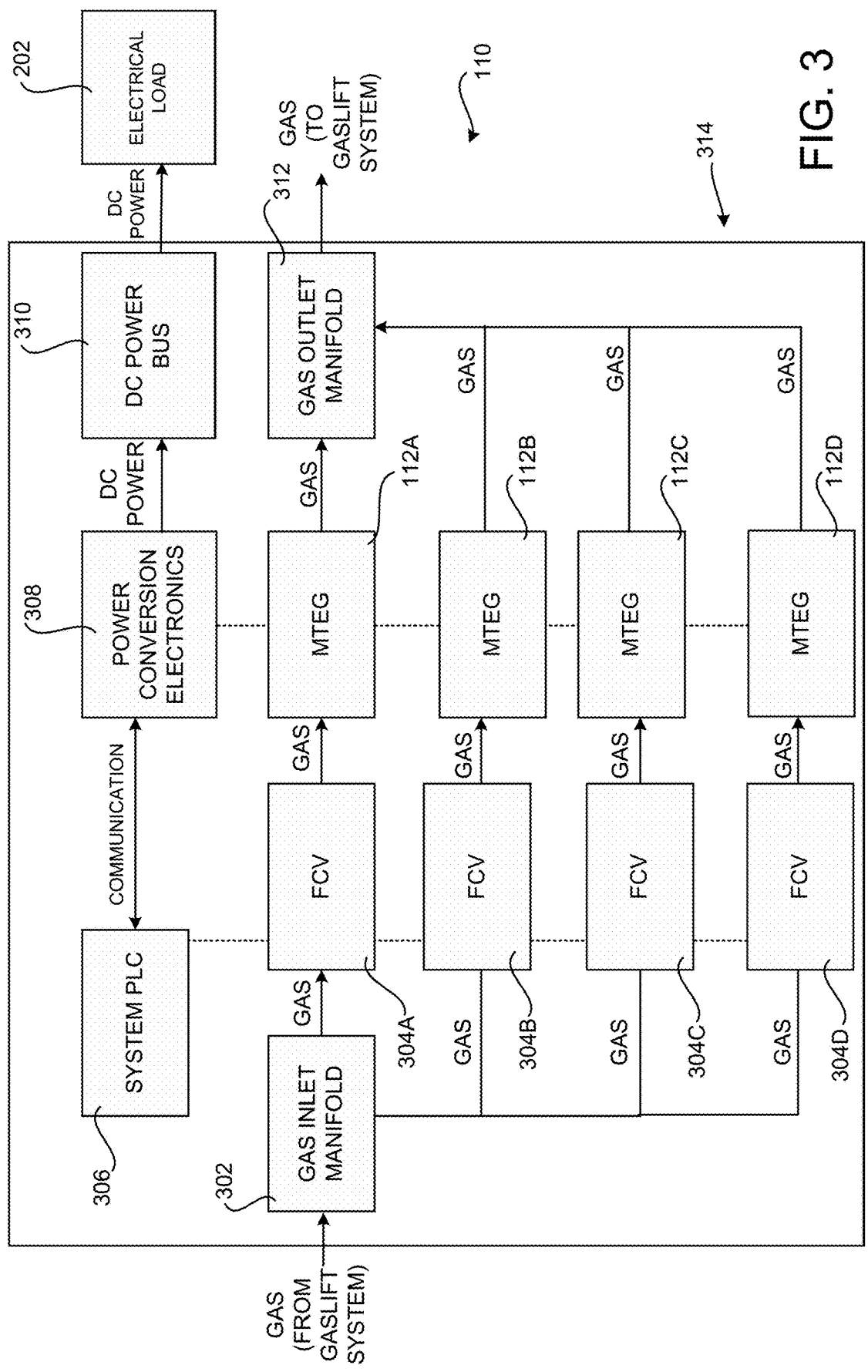
FIG. 3 is a schematic diagram showing aspects of an illustrative mechanical and electrical configuration for the MTEG-based power generation system disclosed herein.

FIG. 3 is a schematic diagram showing aspects of the mechanical and electrical configuration for the MTEG-based power generation system 110 disclosed herein. As shown in FIG. 3, the gas 108A is provided to the power generation system 110 by way of a gas inlet manifold 302. The gas inlet manifold 302 is, in turn, connected to one or more flow control valves ("FCVs") 304A-304D. One flow control valve 304 is provided per MTEG 112 in the power generation system 110 in one configuration. The example power generation system 110 shown in FIG. 3 includes four MTEGs 112A-112D and, therefore, also includes four flow control valves 304A-304D. One FCV 304 might be connected to multiple MTEGS 112 in other configurations.

As also illustrated in FIG. 3, each of the flow control valves 304A-304D is electrically coupled to a system programmable logic controller ("PLC") 306. The PLC 306 is implemented as a field-programmable gate array ("FPGA") in some configurations. The PLC 306 might be implemented in other ways in other configurations including, but not limited to, a personal computer ("PC")-based implementation, a custom microprocessor-based implementation, or another type of computing device. The term "PLC" as used herein encompasses any computing device that can perform the disclosed functionality and, potentially, other types of functionality.

The PLC 306 can control the operation of the flow control valves 304A-304D in order to control the amount of gas 108 flowing to each MTEG 112A-112D. This, in turn, controls the amount of power output by each of the MTEGs 112A-112D. The PLC 306 can also modulate the amount of power generated by completely cutting off the gas 108 to one or more of the MTEGs 112A-112D. In this manner, the PLC 306 can reduce the power output by reducing the power output by one or more of the MTEGS 112A-112D or by completely shutting down one or more of the MTEGs 112A-112D. For example, and without limitation, the PLC 306 might turn off the flow of gas to one or more of the MTEGs 112 completely in response to detection that a MTEG 112 is not operating properly.

The PLC 306 can also alternate the flow of gas 108 to the MTEGs 112A-112D to reduce the amount of wear on individual MTEGs 112A-112D. For instance, one MTEG 112A might be operated for 24 hours (or another period of time) while the other MTEGs 112B-112D are idle. In the next 24-hour period, the MTEG 112B might be operated while the MTEGs 112A, 112C, and 112D are idle and so on. Other types of round robin configurations and other configurations might be utilized to minimize the wear on individual MTEGs 112 in a similar manner.

The PLC 306 can also implement other "smart" features in other configurations such as, but not limited to, recognizing changes to the electrical load 202 and adjusting the flow control values 304A-304B such that the power output by the MTEGs 112A-112D matches the actual load. The PLC 306 can also provide for identifying problems with the MTEGs 112A-112D. For example, the PLC might detect that while the input pressure to the MTEGs 112A-112D remains constant, the output of the MTEGs 112A-112D has dropped. The PLC 306 might generate an alert to maintenance personnel in this situation. The PLC 306 can provide other types of functionality in other configurations.

As also shown in FIG. 3, the natural gas 108A flowing through the MTEGs 112A-112D is output to a gas outlet manifold 312. The gas 108A, in turn, flows from the gas outlet manifold 312 back to the processing components in the gaslift system 114. As mentioned above, the power generation system 110 is more environmentally friendly than previous combustion power generation solutions because the natural gas 108A is not vented or combusted.

The AC generated by the MTEGs 112A-112D is provided to power conversion electronics 308 in one configuration. The power conversion electronics 308 include components for converting the AC to DC, such as one or more rectifiers. In turn, the power conversion electronics 308 provide the DC to a DC power bus 310. The DC power bus 310 powers the system PLC 306 and the electrical load 202 described above with regard to FIG. 2. Additional details regarding the operation of the power conversion electronics 308 are provided below with respect to FIG. 4.

In some configurations, the power generation system 110 is housed within a metal frame, referred to herein as a skid 314. Up to four MTEGs 112A-112D, flow control valves 304A-304D, and other components can be mounted within the skid 314 in one configuration. The manner in which the MTEGs 112A-112D and other components are mounted within the skid 314 enables a large amount of power to be generated while taking up a minimal amount of space on a platform 100 or other location. Additional details regarding one configuration of the skid 314 will be provided below with regard to FIGS. 18 and 19.

Figure 4:
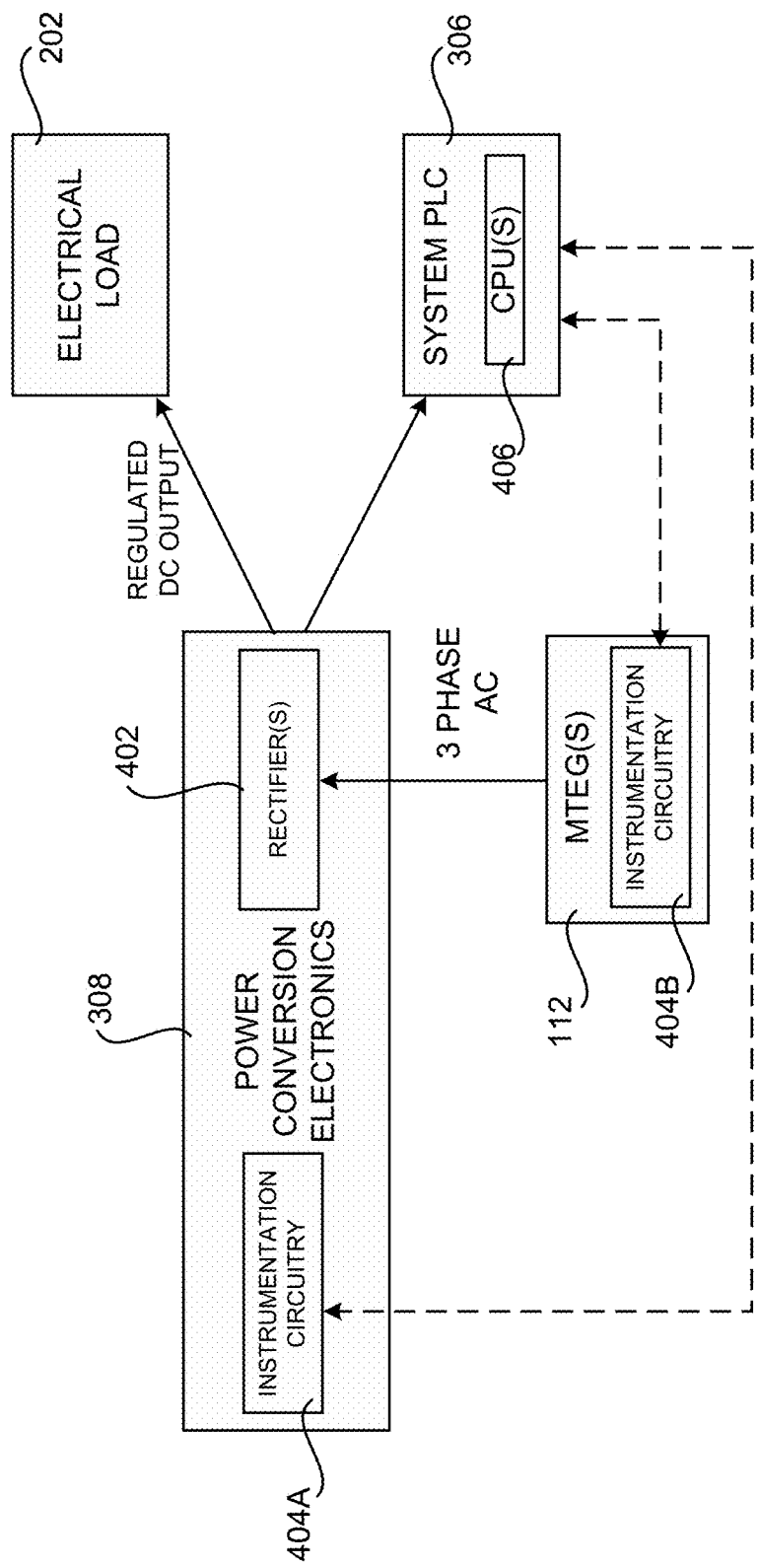
FIGS. 4-6 are schematic diagrams showing additional aspects of the mechanical and electric configuration for the MTEG-based power generation system disclosed herein.

FIG. 4 is a schematic diagram showing additional aspects of an electric configuration for the MTEG-based power generation 110 system disclosed herein. As described briefly above with regard to FIG. 3, the power conversion electronics 308 can include one or more rectifiers 402. The rectifiers 402 rectify the three-phase AC received from the MTEGs 112 to produce regulated DC output. The regulated DC output is provided to the electrical load 202 and to the system PLC 306 in order to power the CPUs 406 or other components of the system PLC 306. The MTEGs 112 generate DC power directly in other configurations.

As also illustrated in FIG. 4, the power conversion electronics 308 can be configured with instrumentation circuitry 404A. The instrumentation circuitry 404A can monitor the operation of the MTEG 112, including the power conversion electronics 308, and provide signals to the system PLC 306 describing aspects of its operation. For example, and without limitation, the instrumentation circuitry 404A might monitor the pressure of gas into and out of the MTEG, revolutions per minute (RPM) of the rotor, temperature of the MTEG 112, temperature of the gas, amount of AC input to the rectifiers 402, the amount of DC output provided to the electrical load 202, the temperature of the power conversion electronics 308, the electrical load 202, etc. Signals describing these aspects of the operation of the power conversion electronics 308 can then be provided to the system PLC 306 for triggering alerts or taking other actions such as, for example, modulating the flow of gas 108A to the MTEGs 112.

Similarly, the MTEGs 112 can be equipped with instrumentation circuitry 404B. The instrumentation circuitry 404B can monitor various parameters describing the operation of the MTEGs 112 including, but not limited to, rotational speed, temperature, output voltage, and others. Data describing the state of these parameters can be provided to the system PLC 306 for use in adjusting the operation of the MTEGs 112 in the manner described above, alerting a maintenance worker in case of a malfunction, or taking other actions.

Figure 5:
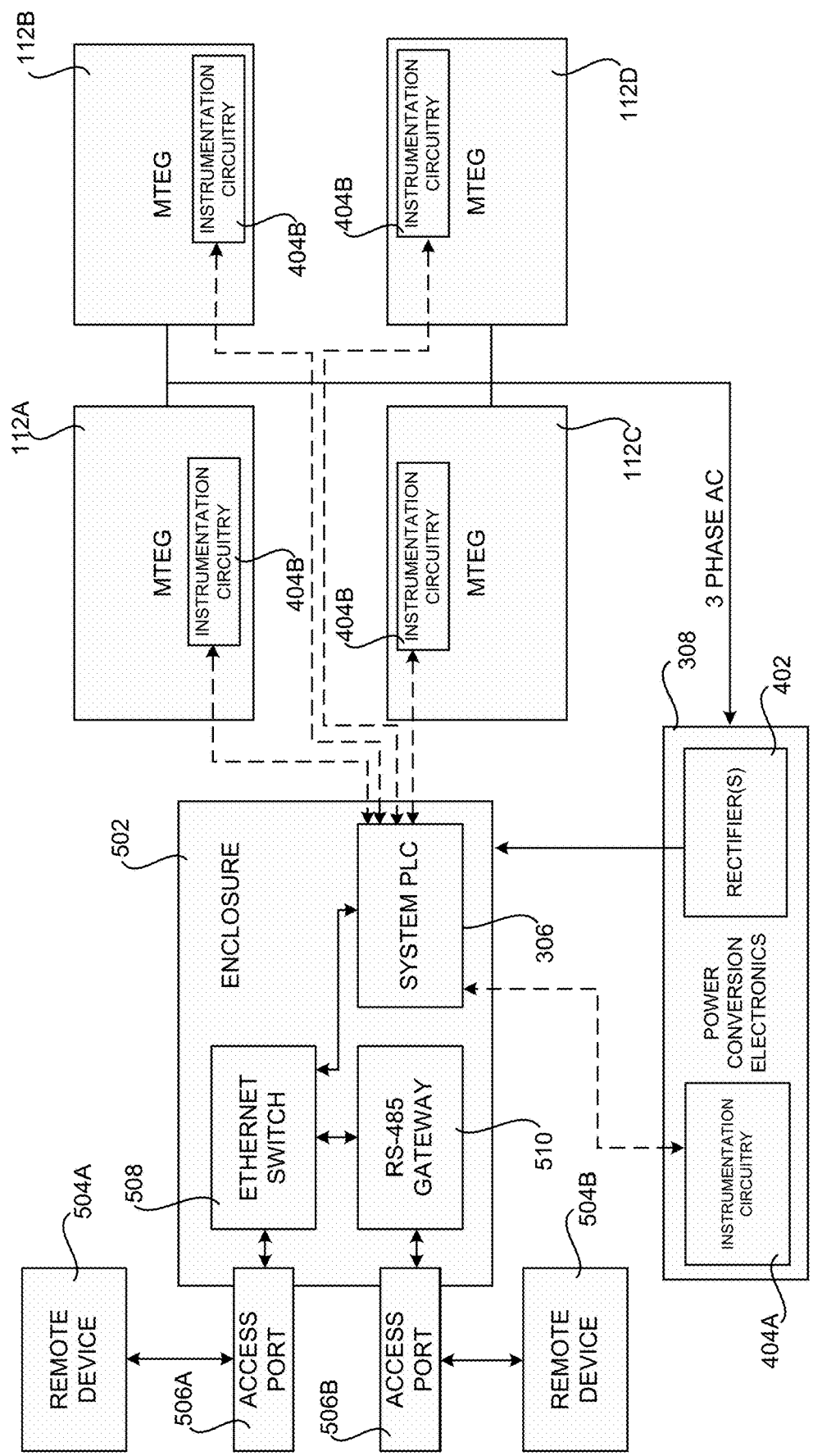

FIG. 5 is a schematic diagram showing additional aspects of an illustrative mechanical and electrical configuration for the MTEG-based power generation 110 system disclosed herein. As shown in FIG. 5, the system PLC 306 is coupled to an Ethernet switch 508 in some configurations. This enables a remote device 504A to access the system PLC 306 by way of an Ethernet connection. Through this connection, the remote device 504A can monitor and control aspects of the operation of the MTEG system 100. The remote device 504A might be located on the platform 100 or located remotely.

As also shown in FIG. 5, the system PLC 306 might also be coupled to an RS-485 gateway 510. The RS-485 gateway 510 can enable a remote device 504B to access the system PLC 306. Other types of communications components can also be coupled to the system PLC 306 to enable other types of devices to access, monitor, and control aspects of the operation of the system PLC 306.

In one configuration, the system PLC 306, the Ethernet switch 508, and the RS-485 Gateway 510 are mounted in a weatherproof enclosure 502. An access port 506 may be provided in the enclosure 502 for connecting the remote device 504 to the Ethernet switch 508. Similarly, an access port 506B may be provided in the enclosure 502 for connecting the remote device 504B to the RS-485 gateway.

Access ports can also be provided in the enclosure 502 for connections between the system PLC 306 and the instrumentation circuitry 404B in the MTEGs 112A-112D, for connections to the instrumentation circuitry 404A in the power conversion electronics 308, and for receiving DC power from the rectifiers 402. The enclosure 502 can be mounted in the skid 314 or in another location. The power conversion electronics 308 can also be mounted in an enclosure (not shown), which might also be mounted in the skid 314 or in another location. In some embodiments (not shown in FIG. 5), the power conversion electronics 308 are mounted within the MTEGs 112 themselves.

Figure 6:
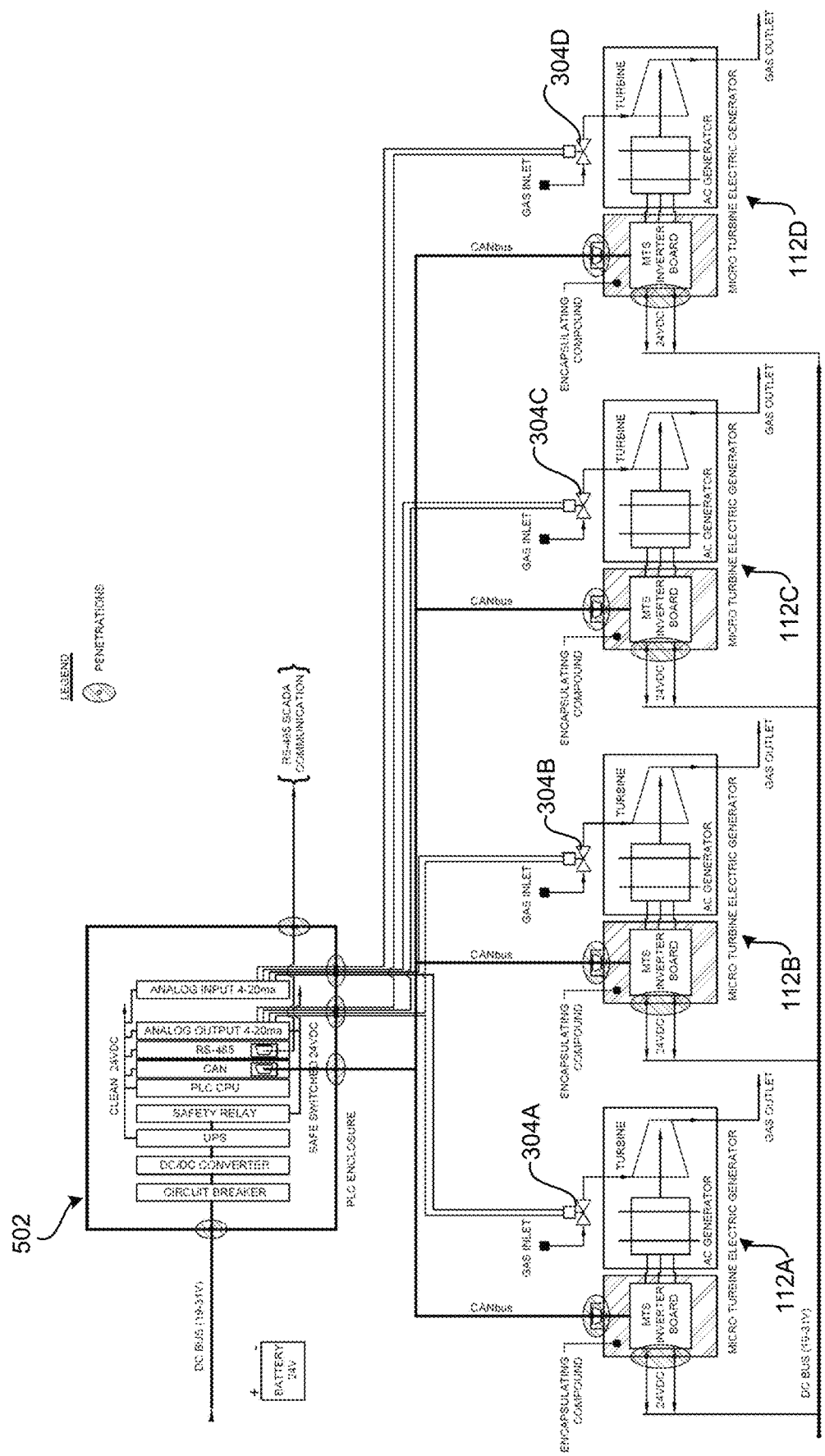

FIG. 6 is a schematic diagram showing additional aspects of an electric and mechanical configuration for the MTEG-based power generation 110 system disclosed herein. In the example shown in FIG. 5, the enclosure 502 includes various types of circuitry including, but not limited to, analog input and output circuitry for interfacing with the flow control valves 304, the RS-485 gateway 510, a CAN bus gateway, and the PLC CPU(s) 406. The enclosure 502 can also include safety relays, an uninterruptible power supply ("UPS"), a DC/DC converter, and/or a circuit breaker connected in series to a DC bus to provide 24V DC to the other components in the enclosure 502.

In the configuration shown in FIG. 6, a gas inlet manifold 302 couples to the FCVs 304A-304D to provide pressurized natural gas 108 to each of the MTEGs 112A-112D under the control of the PLC 306. A gas outlet manifold 312 routes the gas 108 from the MTEGs 112A-112D back to the production facilities so that the gas 108 is not flared or vented into the environment. In this configuration, an AC generator is located within the housing of each MTEG 112 and an inverter board is mounted external to the housing. As discussed above, however, the power conversion electronics 308 (e.g. the inverter) can be located remotely from the MTEG housing (e.g. in the PLC enclosure 502) or completely within the housing of the MTEG 112 in other configurations.

Figure 7:
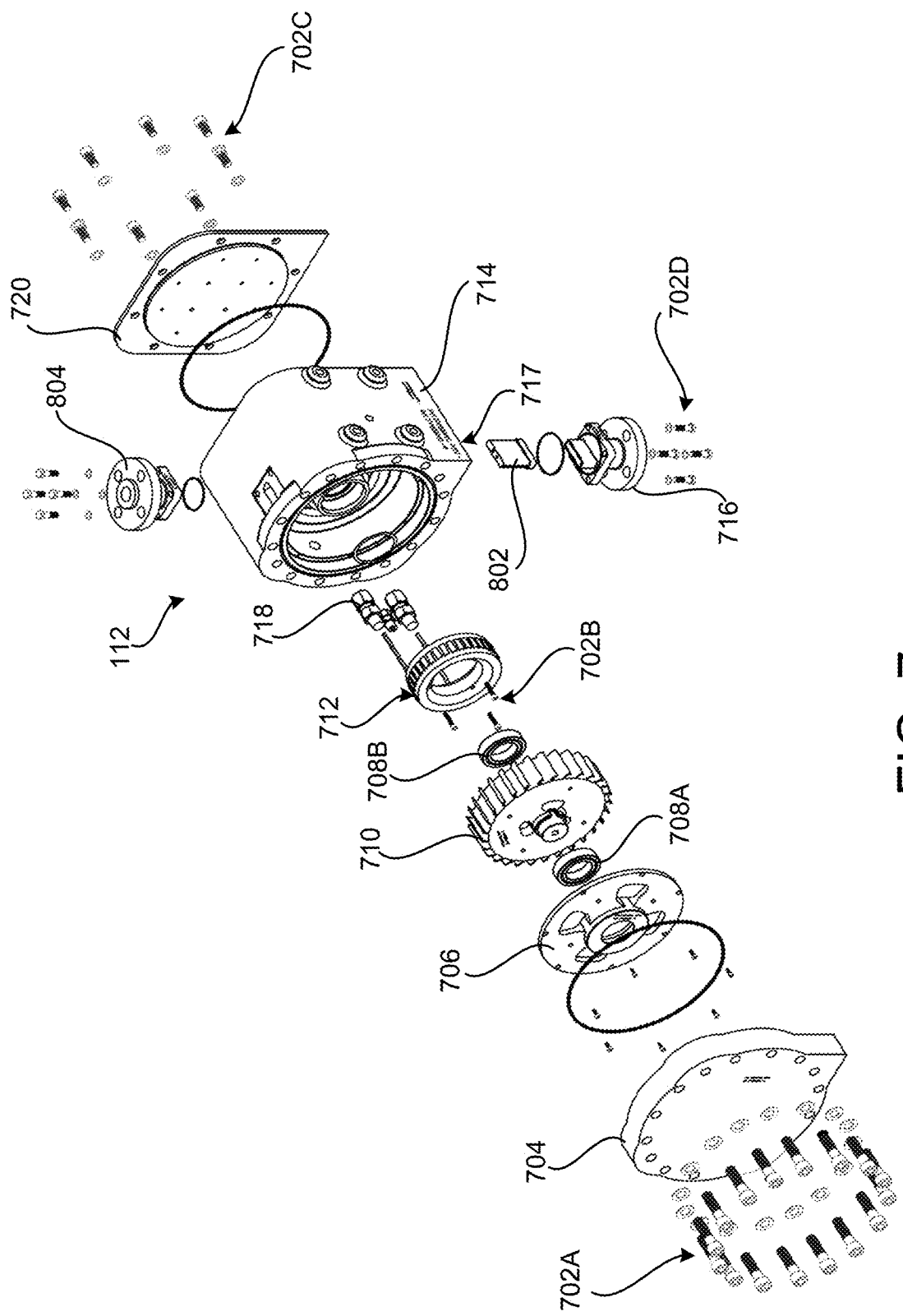
FIG. 7 is an exploded perspective view of a MTEG disclosed herein.

FIG. 7 is an exploded view of a MTEG 112 according to one embodiment disclosed herein. As illustrated in FIG. 7, the MTEG 112 includes a housing 714. The housing 714 can be constructed from stainless steel or another non-corrosive material suitable for use in an industrial oil and gas production environment or another type of remote environment. A cover plate 704 is affixed to one side of the housing 714 using screws 702A. The cover plate 704 and the screws 702A can also be constructed from stainless steel or another non-corrosive material. The cover plate 704 seals one side of an internal cavity formed by the housing 714 when affixed thereto using the screws 702A. A rear cap 720 seals a distal side of the internal cavity of the housing 714 when affixed thereto using the screws 702C.

Figure 8:
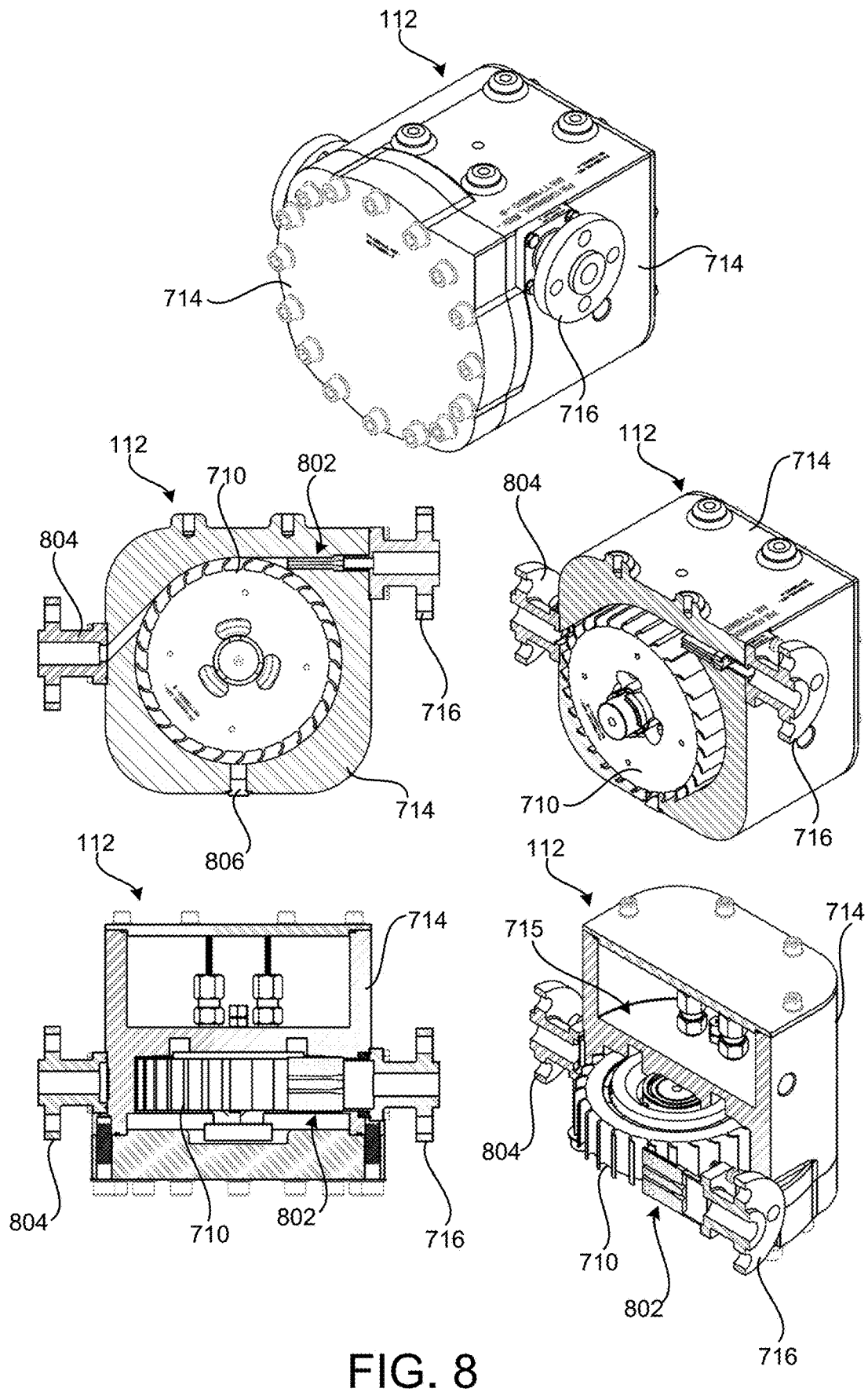
FIG. 8 includes several cross-sectional views and several perspective views of the MTEG disclosed herein in fully assembled form.

As also illustrated in FIG. 7, the MTEG 112 also includes a bearing retainer 706 for retaining a bearing 708A. As illustrated in FIG. 8 and described below, a second bearing 708B mates with a wall of the internal cavity of the housing 714. The bearings 708A and 708B mate with a rotor 710. As will be described in greater detail below, the rotor 710 rotates around the bearings 708A and 708B when compressed gas is expanded across the blades of the rotor 710.

As will also be described in greater detail below, a stator 712 is affixed to a wall of an internal cavity of the housing 714 using the screws 702B. The rotor 710 rotates around the stator 712, thereby generating electrical current when the rotor 710 is rotated by the expansion of the compressed gas. The compressed gas enters the housing 714 by way of an inlet 717 formed in the housing 714. In one embodiment, a removable nozzle 802 (described further below) mates with the inlet 717 and provides channels that direct the compressed gas over the blades of the rotor 710. An inlet adapter 716 can also be affixed to the housing 714 over the removable nozzle using the screws 702D. Various configurations of the inlet adapter 716 can be provided to enable different types of piping to be connected to the inlet 717 of the housing 714. In a similar fashion, an outlet adapter 804 can be utilized to connect various types of piping to the outlet port of the MTEG 112.

As also shown in FIG. 7, passthroughs 718 can be provided through the wall of the cavity of the housing 714. The passthroughs 718 can enable, for example, wiring for sensors to pass through the wall of the cavity of the housing 714. This is illustrated in FIG. 8, described below.

Additionally, a cavity of the housing 714 can enclose a circuit board (not shown in FIG. 7) in some configurations. As discussed above, the circuit board can include instrumentation circuitry 404 including sensors for monitoring various aspects of the operation of the MTEG 112 such as, for example, temperature and rotational speed. The circuit board 715 can also, or alternately, include the power conversion electronics 308 in some configurations. Other types of circuitry can be located on the circuit board 715 in other configurations. Additional details regarding the configuration and operation of the MTEG 112 will be provided below.

FIG. 8 includes several cross-sectional views and several perspective views of the MTEG 112 in fully assembled form. As shown in FIG. 8, the inlet adapter 716, when affixed to the housing 714, retains the nozzle 802 in a position to direct input compressed gas over the blades of the rotor 710. Additionally, an outlet adapter 804 can be affixed to and outlet of the housing 714. Various configurations of the outlet adapter 804 can be provided to enable different types of piping to be connected to the outlet of the housing 714 where gas exits the housing 714.

As also shown in FIG. 8, the housing 714 can include a drain 806 in some configurations. The housing 714 can be mounted in the skid 314 in such a manner as to allow condensate to escape from the housing 714 due to the force of gravity. Additional details regarding the mounting of the MTEG 112 within the skid 314 will be provided below with regard to FIGS. 18 and 19.

As also shown in FIG. 8 and described briefly above, the internal section of the housing 714 can form several cavities. The cavities can be divided by a wall, with the rotor 710, stator 712, and bearings 708A and 708B on one side of the wall in one cavity and the circuit board 715 implementing the power conversion electronics and, potentially, instrumentation components (and potentially other components) in a second cavity on the other side of the wall.

One or more passthroughs 718 can also be provided through the wall to enable wires to pass from the stator 712 to the circuit board 715 or out of the housing 714. Passthroughs can also be provided through the housing 714 to enable wires to pass through the housing 714 to external components, such as the instrumentation circuitry 404 and/or the power conversion electronics 308. FIGS. 11A-11F and 12A-12B include perspective and cross-sectional views of a fully sealed MTEG disclosed herein.

Figure 9:
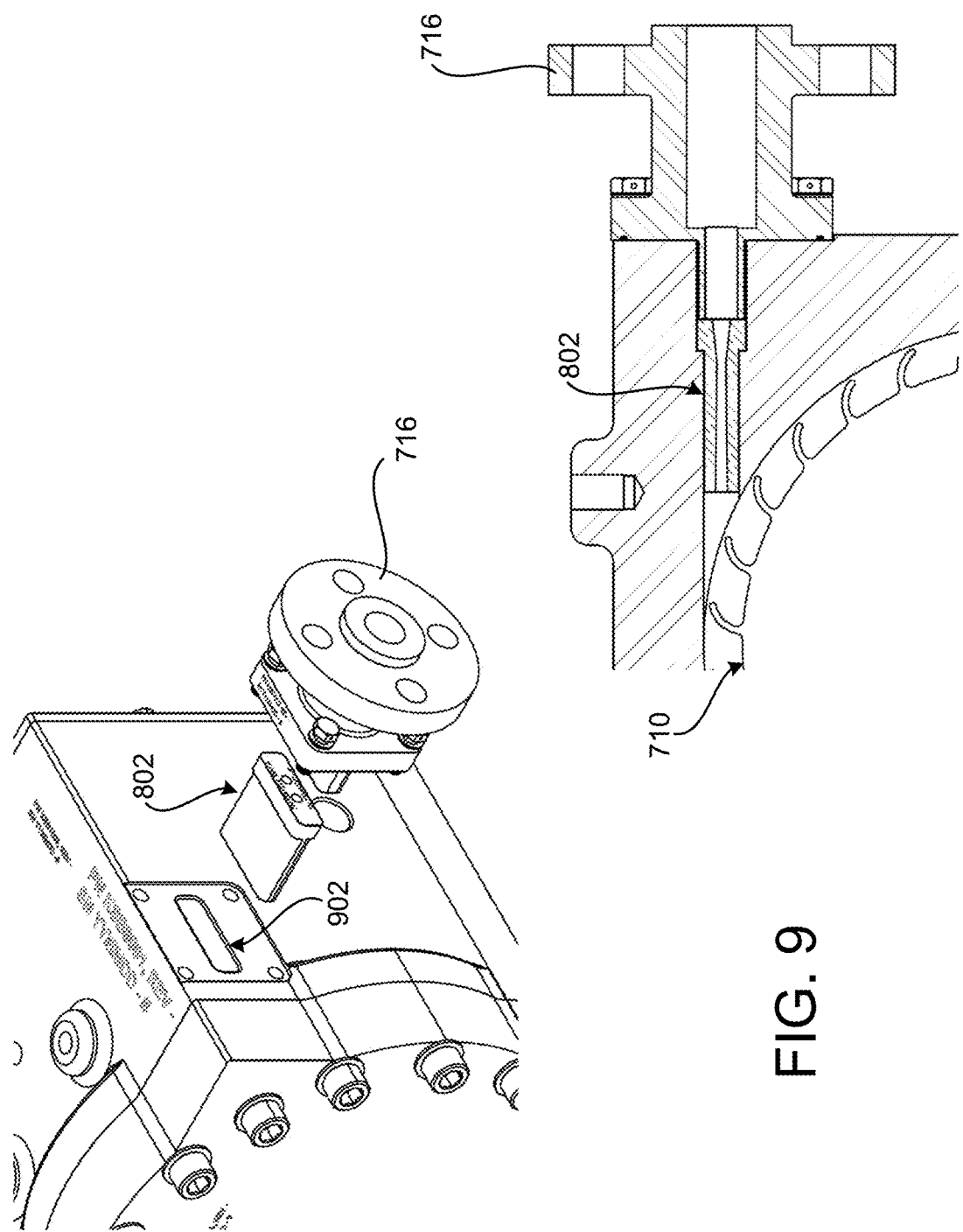
FIG. 9 includes a perspective view and a cross-sectional view showing aspects of a modular nozzle utilized in various configurations of the MTEG disclosed herein.

FIG. 9 includes a perspective view and a cross-sectional view showing additional aspects of a removable nozzle 802 utilized in various configurations of the MTEG 112 disclosed herein. Because the nozzle 802 is user-removable while the MTEG 112 is in service (i.e. with the flow of gas 108A removed from the MTEG 112), the nozzle 802 can be quickly replaced if it becomes worn or corroded by the input compressed gas.

As described briefly above, the housing 714 includes an inlet, or receptacle 902, for receiving the nozzle 802. The inlet adapter 716, when affixed to the housing 714 by placing the inlet adapter 716 into the receptacle 902, maintains the nozzle 802 in a secure position against an abutment within the receptacle 902. Compressed gas flows through the inlet adapter 716, through the nozzle 802, and onto the blades of the rotor 710.

In the example shown in FIG. 9, the nozzle 802 includes four channels through which the compressed gas flows. As will be described in greater detail below with regard to FIG. 14, the channels are configured to optimize the efficiency of the rotor 710 to convert the compressed gas into rotational movement.

In some configurations, the nozzle 802 is made of stainless steel. The nozzle 802 can be made of or coated with other materials in other configurations such as, but not limited to, ICONEL, which an alloy of nickel containing chromium and iron, that is resistant to corrosion at high temperatures. Other portions of the MTEG 112 can also be made from or coated with ICONEL such as, but not limited to, the internal portions of the housing 714, to reduce the effects of corrosion caused by sour input gas.

Figure 10B:
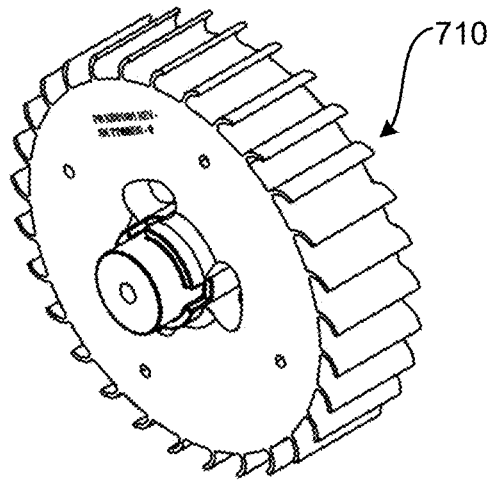
FIGS. 10A-10D are perspective diagrams showing aspects of a rotor utilized by the MTEG disclosed herein.
Figure 10A:
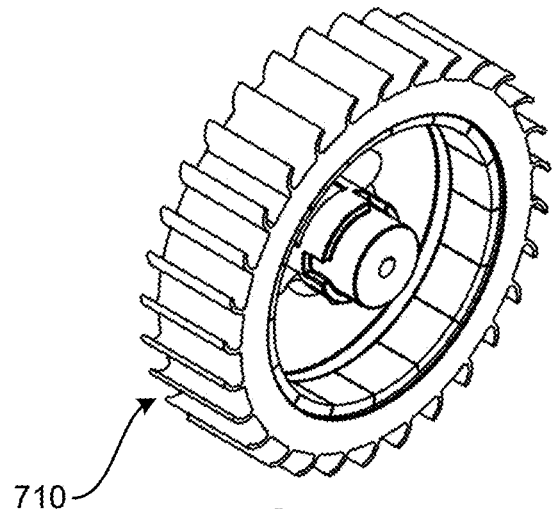
Figure 10C:
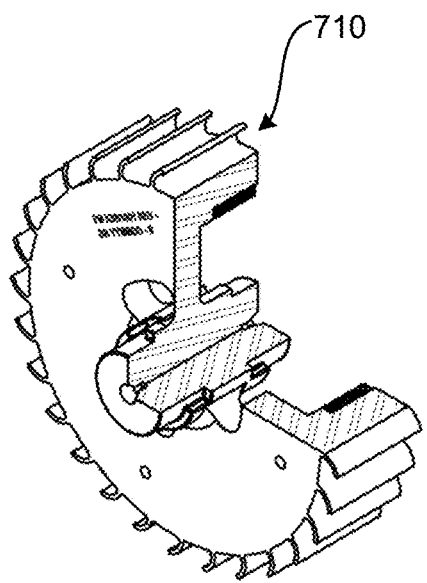
Figure 10D:
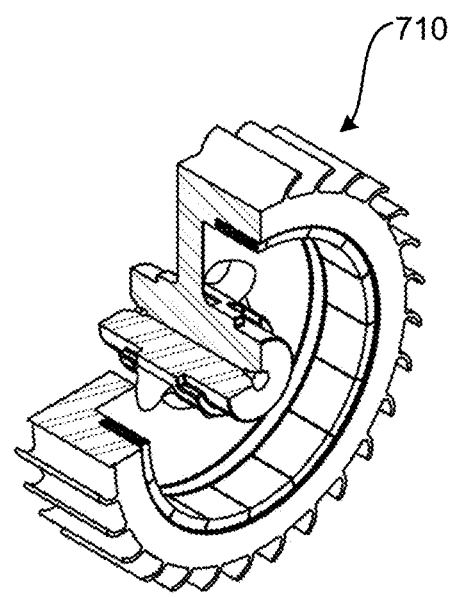
Figure 11A:
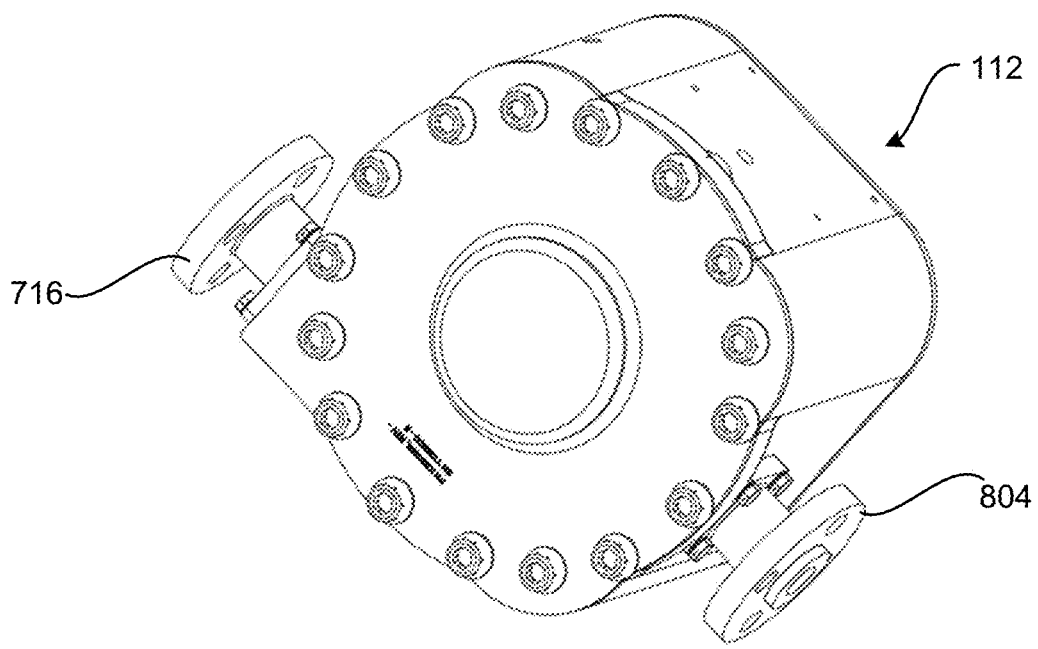
FIGS. 11A-11F and 12A-12B include perspective and cross-sectional views of a fully sealed MTEG disclosed herein.
Figure 11B:
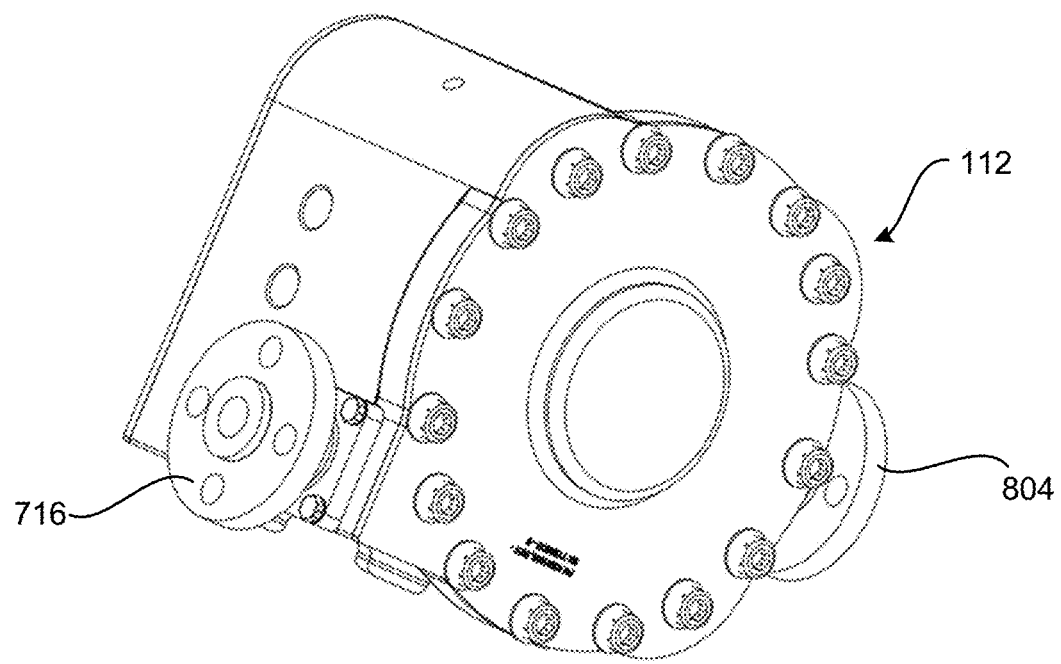
Figure 11C:
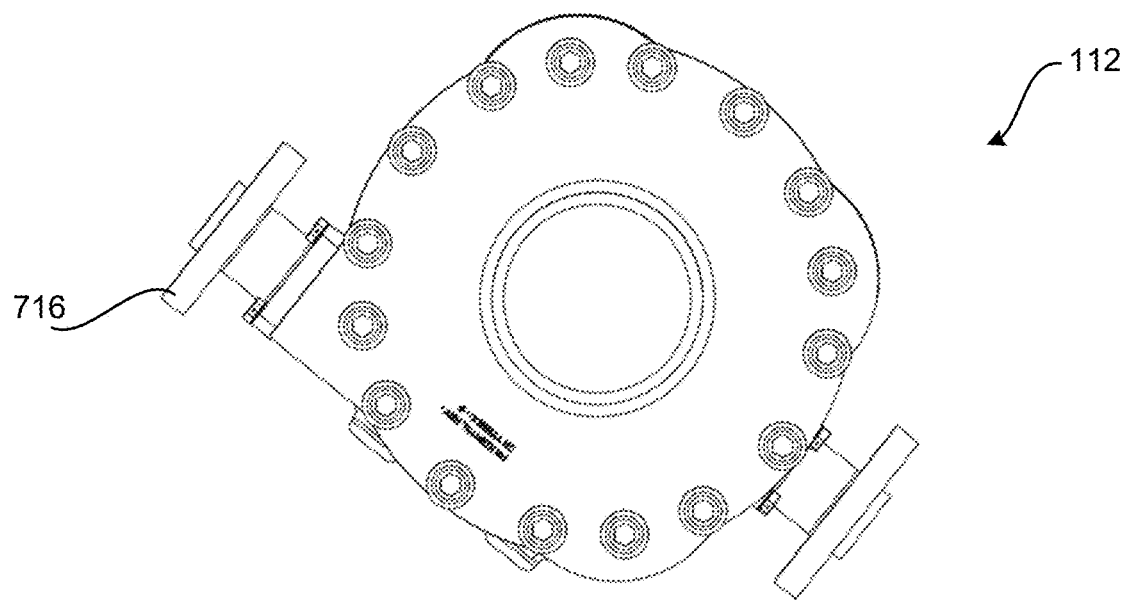
Figure 11D:
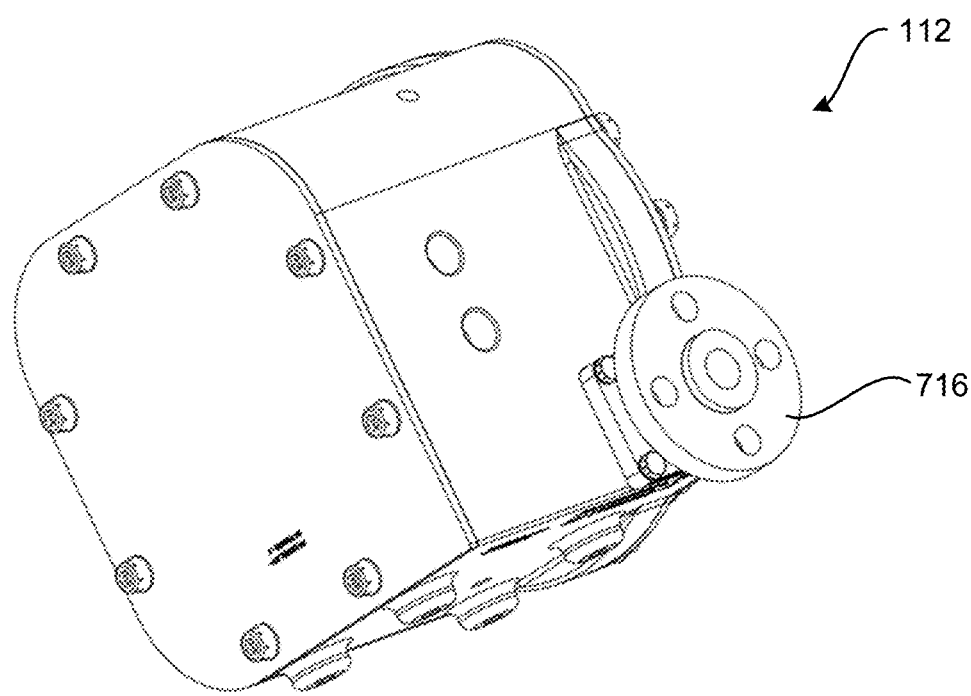
Figure 11E:
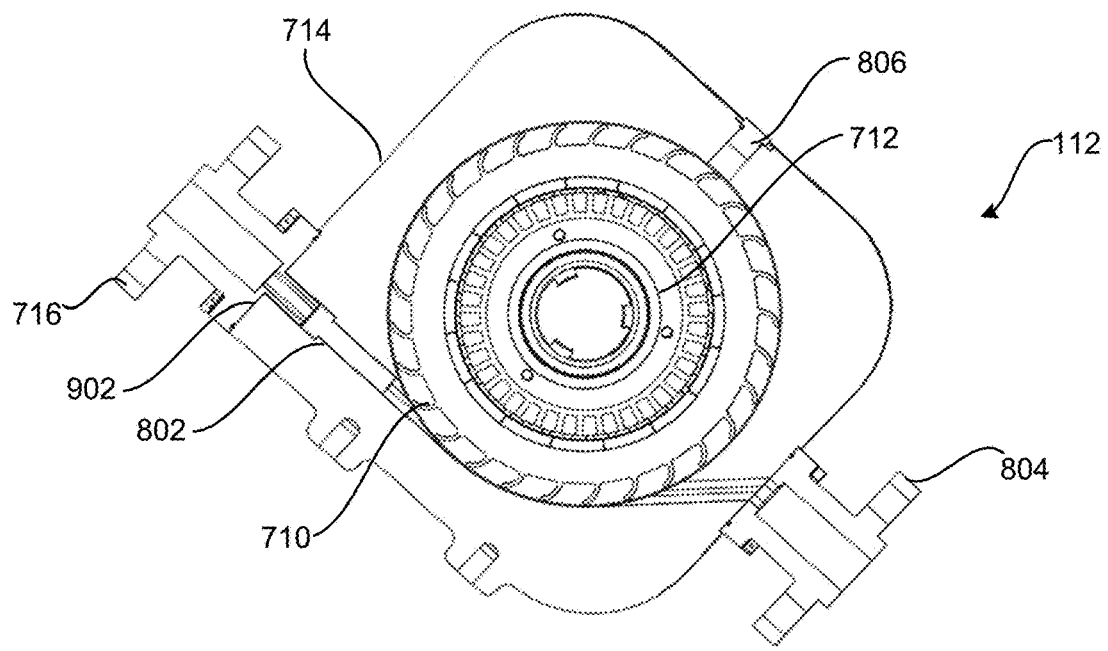
Figure 11F:
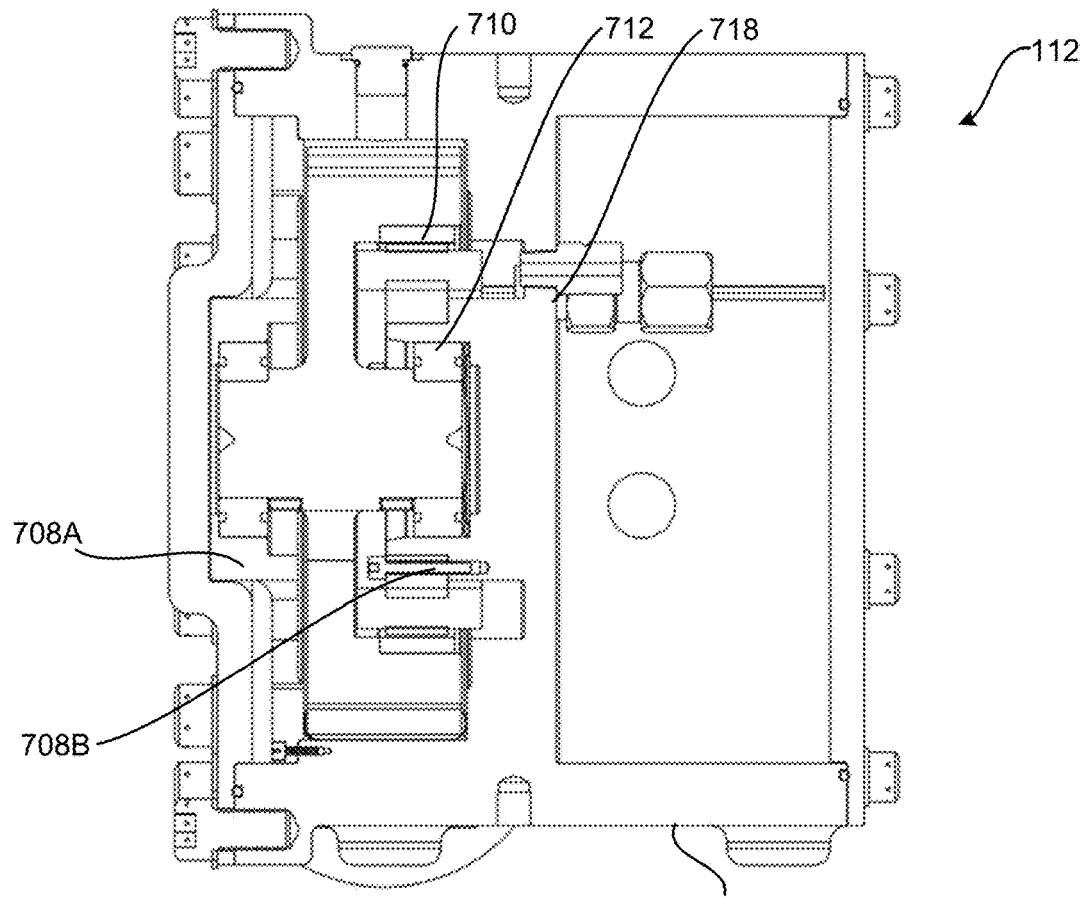
Figure 12A:
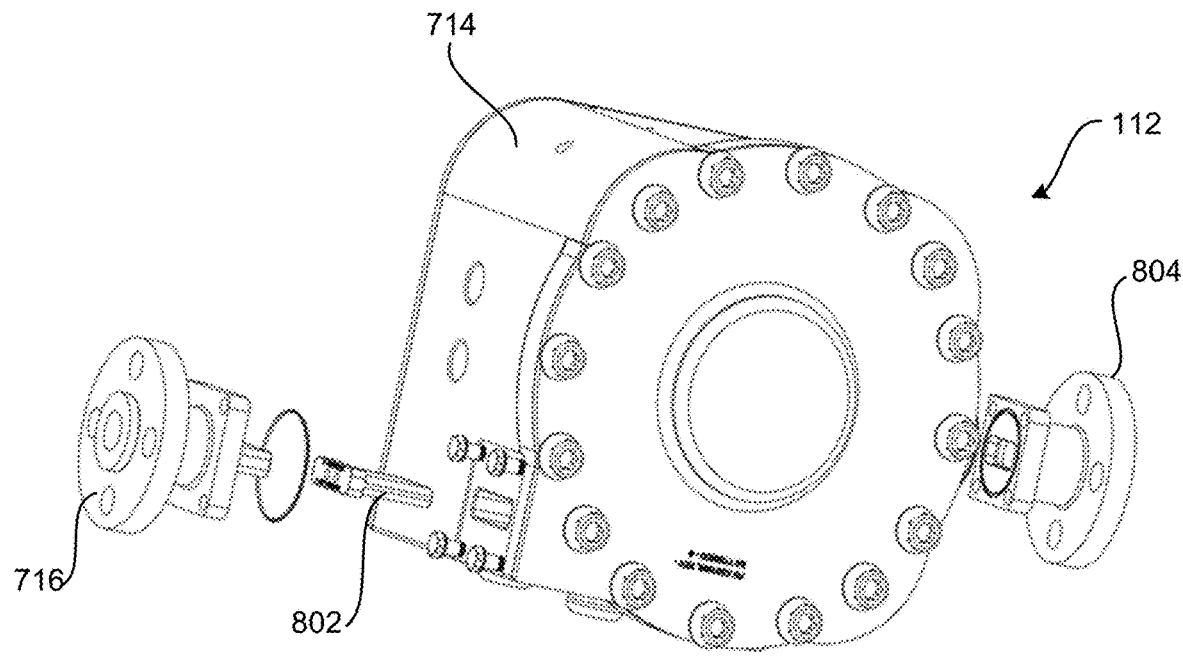
Figure 12B:
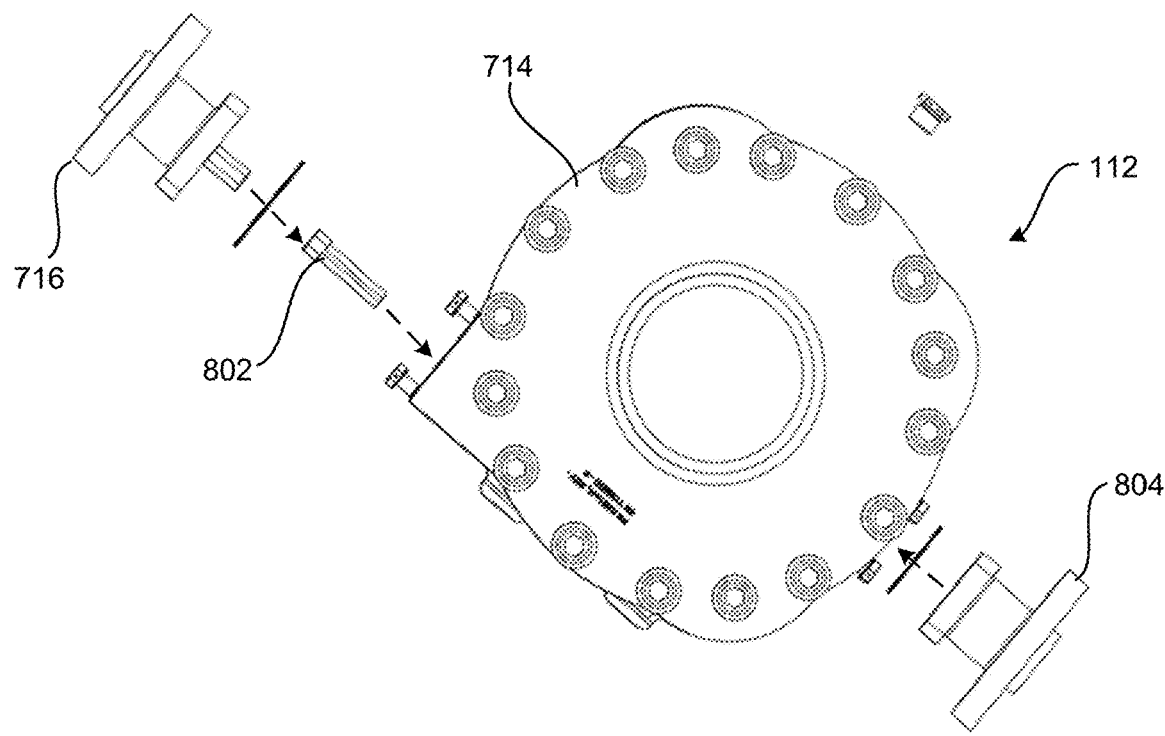

FIGS. 10A-10C are perspective diagrams showing aspects of a rotor 710 utilized by the MTEG 112 disclosed herein. As shown in FIGS. 10A-10C, the rotor 710 includes a number of blades (29 in the illustrated configuration) around its outside surface and a number of magnets located on its inside surface. The blades are configured to operate in conjunction with the nozzle 802 to optimize the efficiency of the rotor 710 to convert input compressed gas into rotational movement. The rotor 710 includes a central hub for mating with the bearings 708A and 708B to enable rotational movement of the rotor 710 around the stator 712. Additional details regarding the configuration of the rotor 710 will be provided below with regard to FIGS. 13A and 13B.

FIGS. 11A-11F and 12A-12B include perspective and cross-sectional views of a fully sealed MTEG 112 disclosed herein, including an inlet adapter 716 and an outlet adapter 804. These views further illustrate the configuration of the various components of the MTEGs 112 described above with regard to FIGS. 7-10D.

Figure 13A:
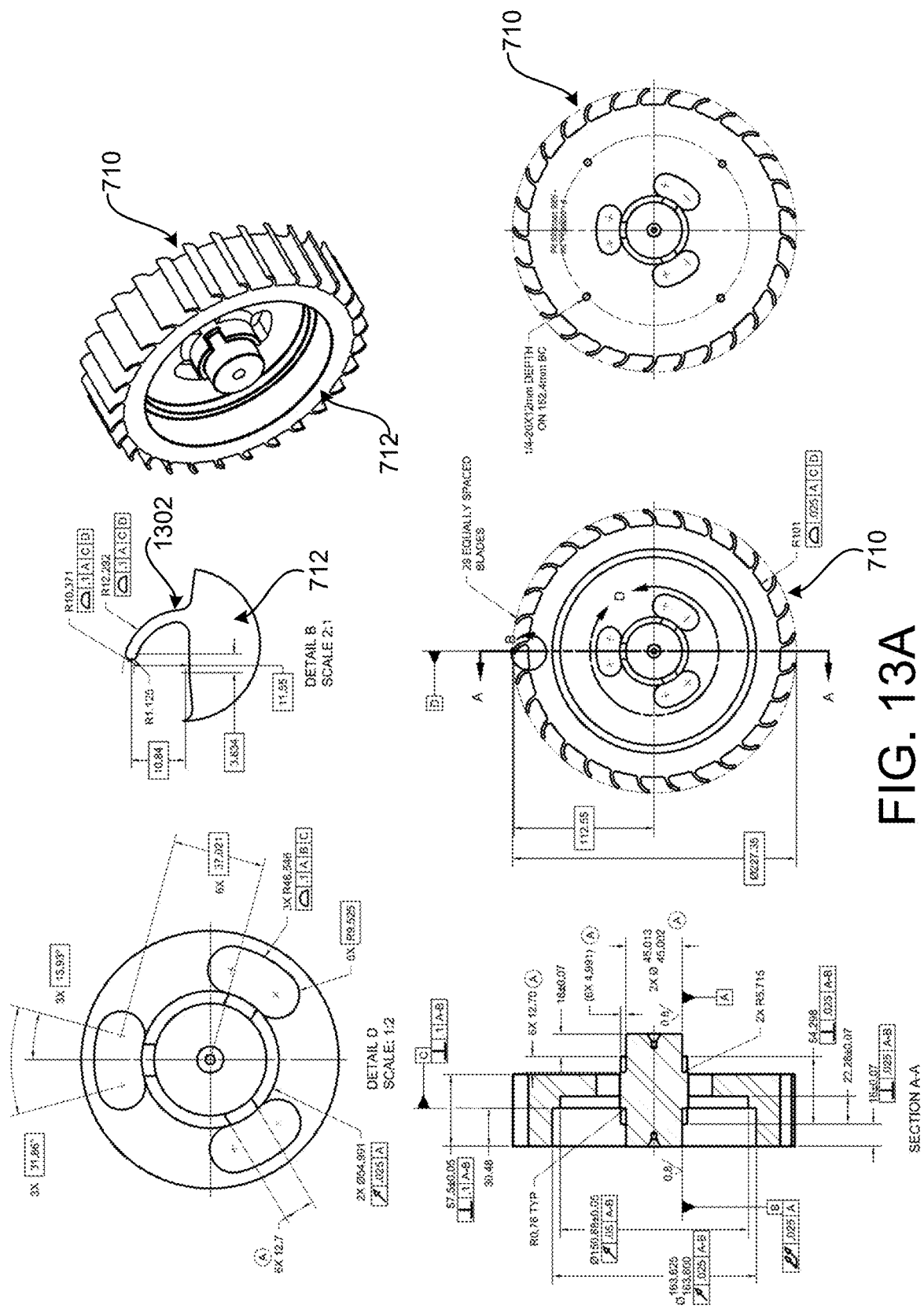
FIG. 13A and 13B include several perspective diagrams showing additional aspects of an illustrative configuration for a rotor utilized by the MTEG disclosed herein.
Figure 13B:
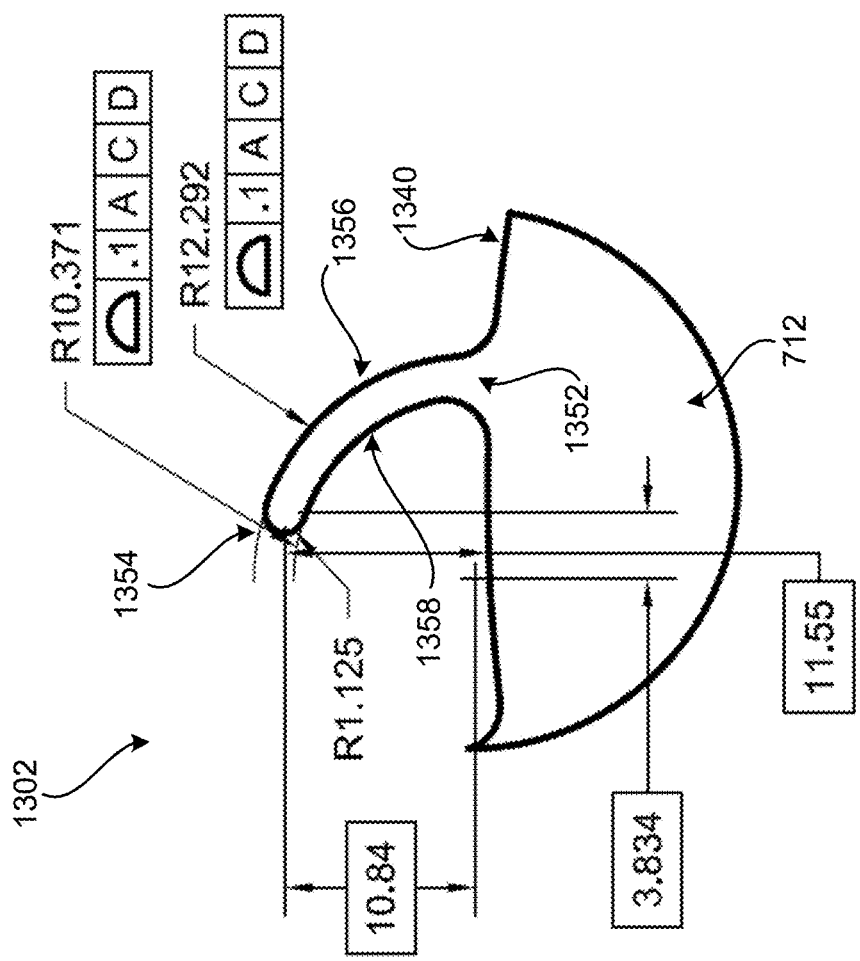

FIGS. 13A and 13B include several perspective diagrams showing additional aspects of an illustrative configuration for a rotor 710 utilized by the MTEG 112 disclosed herein in some configurations. As shown in FIG. 13A and discussed above, the rotor 710 includes blades 1302 arranged along its outer perimeter. In one configuration, for instance, the rotor 710 includes 29 evenly spaced blades 1302 adjacent to a rotor body 712. The blades 1302 can be integrated with the rotor body 712 (i.e. made from a single piece of material), as shown, or might be a part of a separate component attached to the rotor body 712.

Dimensions for the rotor 710 and the blades 1302 in one particular configuration are shown in FIG. 13. As mentioned above, the illustrated configuration of blades 1302 is optimized maximize the efficiency of the rotor 710 to convert the compressed gas input to the MTEG 112 into rotational movement. In this regard, it is to be appreciated that the dimensions of the rotor 710 and the blades 1302 shown in FIG. 13 are merely illustrative and that other dimensions can be utilized in other configurations.

It is to be appreciated that the geometry of the blade 1302 and also the number of blades 1302 shown in FIG. 13 has been optimized to operate with a predefined range of pressure of the input gas. In one embodiment, the pressure rating and corresponding nozzle and blade design for the power level of 1 Kw and speed of 6000 rpm is 40-60 bar. Up to 120+/−bar is acceptable in the illustrated configuration.

FIG. 13B shows additional aspects of the configuration of a blade 1302 according to one particular configuration. As described briefly above, the rotor 710 includes a plurality of rotor blades 1302 (29 in one particular embodiment) that protrude from the rotor body 712. The diameter of the rotor is 227.35 mm in one particular embodiment.

Each of the rotor blades 1302 includes a connection end 1352 that is located adjacent to an outer surface 1340 of the rotor body 712. The blades 1302 also include a distal end 1354 that is spaced apart from the outer surface 1340 of the rotor body 712. The distance between the distal end 1354 and the outer surface 1340 of the rotor body 712 is between 10 mm and 11 mm according to various embodiments. The distance between the distal end 1354 and the outer surface 1340 rotor body 712 is 10.84 mm in one particular configuration. In some configurations, the distal end 1354 has a radius between 1 and 2 mm. In one particular embodiment, the distal end 1354 has a radius of 1.125 mm.

As shown in FIG. 13B, the blades 1302 also include an outer surface 1356 between the connection end 1352 and the distal end 1354. The outer surface 1356 has a radius between 12 mm and 13 mm according to various embodiments. The outer surface 1356 has a radius of 12.292 mm in one particular embodiment.

As also shown in FIG. 13B, the blades 1302 also include an inner surface 1358 between the connection end 1352 and the distal end 1354. The inner surface 1358 has a radius between 10 mm and 11 mm according to various embodiments. The inner surface 1358 has a radius of 10.371 mm in one particular embodiment. It is to be appreciated that values for the radius and distances described above can include values approximately equal to those described herein. These values might also include values that are multiples of the disclosed values (i.e. the dimensions described herein might be scaled in order to make the turbine smaller or larger while maintaining the same proportions).

Figure 14:
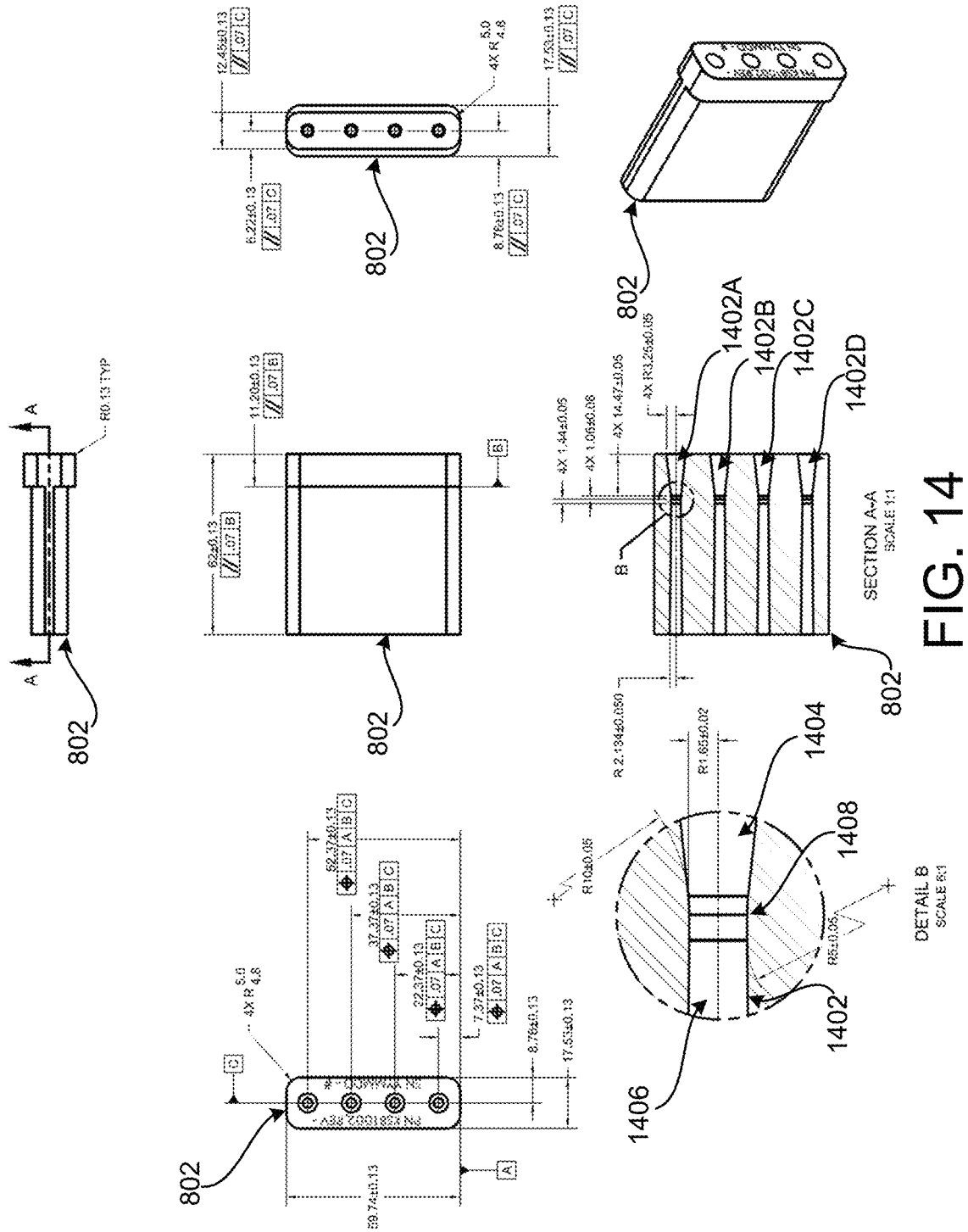
FIGS. 14-17 are perspective views showing additional aspects of the configuration of a removable nozzle, an inlet adapter, and an outlet adapter utilized in various configurations of the MTEG disclosed herein.

FIGS. 14-17 are perspective views showing additional aspects of the configuration of a removable nozzle 802, an inlet adapter 716, and an outlet adapter 804 utilized in various configurations of the MTEG 112 disclosed herein. As shown in FIG. 14 and described briefly above, the nozzle 802 includes a number (four in the illustrated configuration) of channels 1402A-D. The channels 1402 enable gas to pass through the inlet adapter 716 into the internal cavity of the housing 714 containing the rotor 710 and onto the blades 1302 of the rotor 710. In the example shown in FIG. 14, the nozzle 802 includes four channels 1402A-D. It is to be appreciate that the nozzle 802 can include fewer or more channels 1402 in other configurations.

It is to be appreciated that the flow of high pressure gas through the nozzle 802 and the channels 1402 and the resulting impingement to the specific design of the turbine blade described above results in motivation to the described machine. The specific design geometry of the channels 1402 maximizes efficiency of the MTEG 112. In particular, the channels 1402 have a converging portion 1404 and a diverging portion 1402. Dimensions for the converging portion 1404, the diverging portion 1406, and the area between the converging portion 1404 and the diverging portion 1406 in one example configuration are shown in FIG. 14.

As shown in FIG. 14, the channels 1402 are tapered to further compress the input compressed gas. The nozzle 802 is also configured to be removably mounted within the receptacle 902. In this manner, the nozzle 802 can be replaced should it become worn or corroded. Nozzles 802 with different configurations can also be utilized depending upon the application, the type of compress gas being utilized, and/or other factors. The nozzle can be constructed of stainless steel, ICONEL, or another suitable material.

As described briefly above, the nozzle 802 includes circular channels 1402 therethrough. As also discussed above, each of the channels 1402 includes a converging portion 1404. The converging portion 1404 converges from a radius of approximately 3.25 mm at a first end to a radius of approximately 1.65 mm at a second end. The converging portion is approximately 14.47 mm long in one particular configuration.

The channels 1402 also include a diverging portion 1406, which diverges from a radius of approximately 1.65 mm at a first end (i.e. the end closest to the converging portion 1404) to a radius of approximately 2.134 mm at a second end. The channels 1402 also include a nozzle throat 1408 between the second end of the converging portion 1404 and the first end of the diverging portion 1406. The nozzle throat is approximately 2.5 mm long in one particular configuration.

Specific dimensions for the nozzle 802 and the channels 1402 in one particular configuration are shown in FIG. 14. The illustrated configuration of the input channels 1402 is optimized maximize the efficiency of the rotor 710 to convert the compressed gas input to the MTEG 112 into rotational movement. In this regard, it is to be appreciated that the dimensions of the nozzle 802 shown in FIG. 14 are merely illustrative and that other dimensions can be utilized in other configurations. These values might also include values that are multiples of the disclosed values (i.e. the dimensions described herein might be scaled in order to make the nozzle 802 smaller or larger while maintaining the same proportions).

Figure 15:
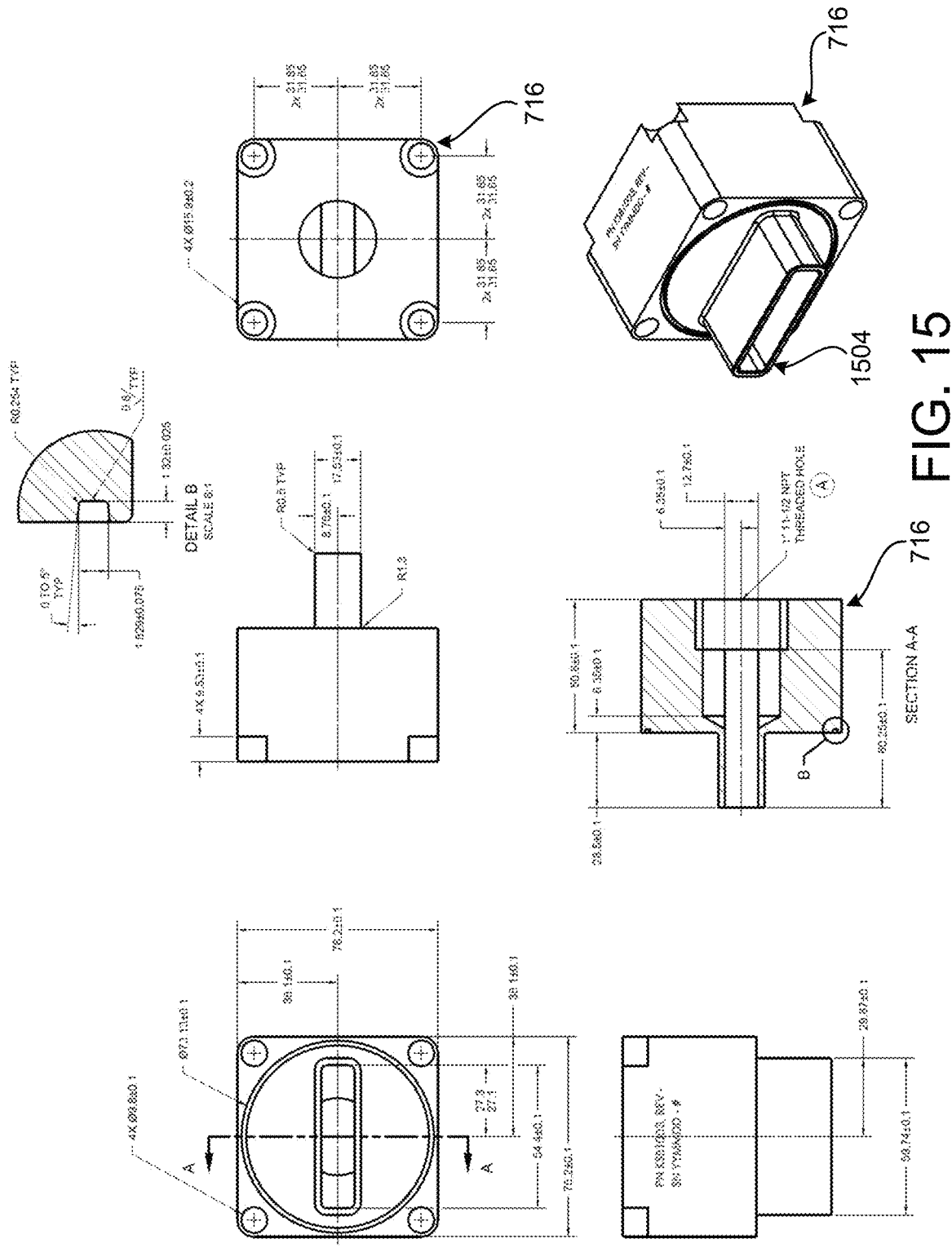

FIG. 15 shows an illustrative configuration and dimensions for the inlet adapter 716 in one particular configuration. In this configuration, the inlet adapter 716 includes a protruding coupling 1504 for mating with the receptacle 902 of the housing 714 and holding the nozzle 802 in place within the receptacle 902. A distal end of the inlet adapter 716 can include a threaded hole 1502 for mating with a pipe connected to a source of compressed input gas.

Figure 17:
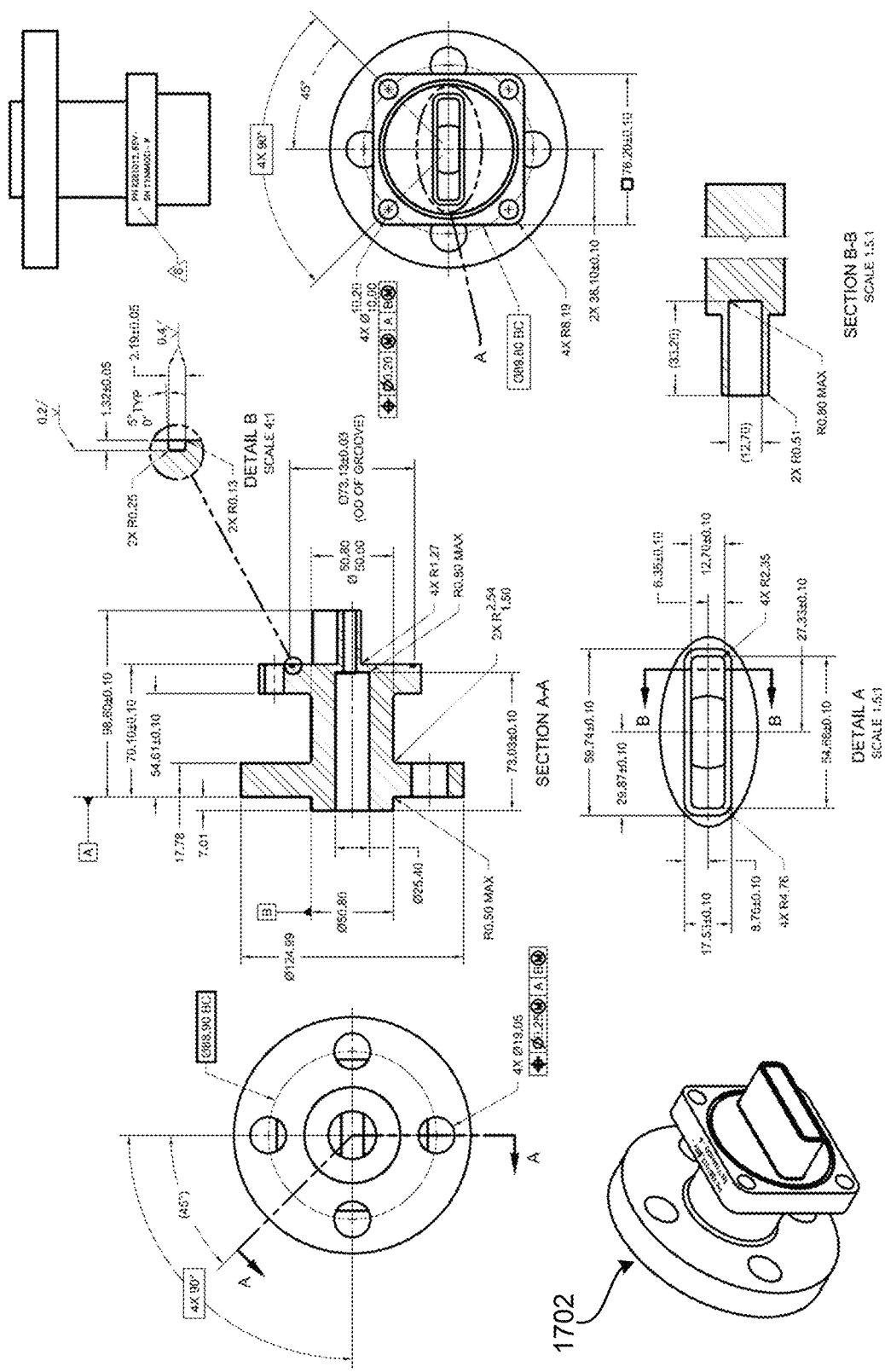

The inlet adapter 716 also includes apertures therethrough for receiving screws or other types of fasteners for affixing the inlet adapter 716 to the housing 714. It is to be appreciated that the dimensions of the inlet adapter 716 shown in FIG. 15 are merely illustrative and that other dimensions can be utilized in other configurations. FIG. 17 illustrates an alternate configuration of the inlet adapter 716 that includes a raised base flange 1702.

Figure 16:
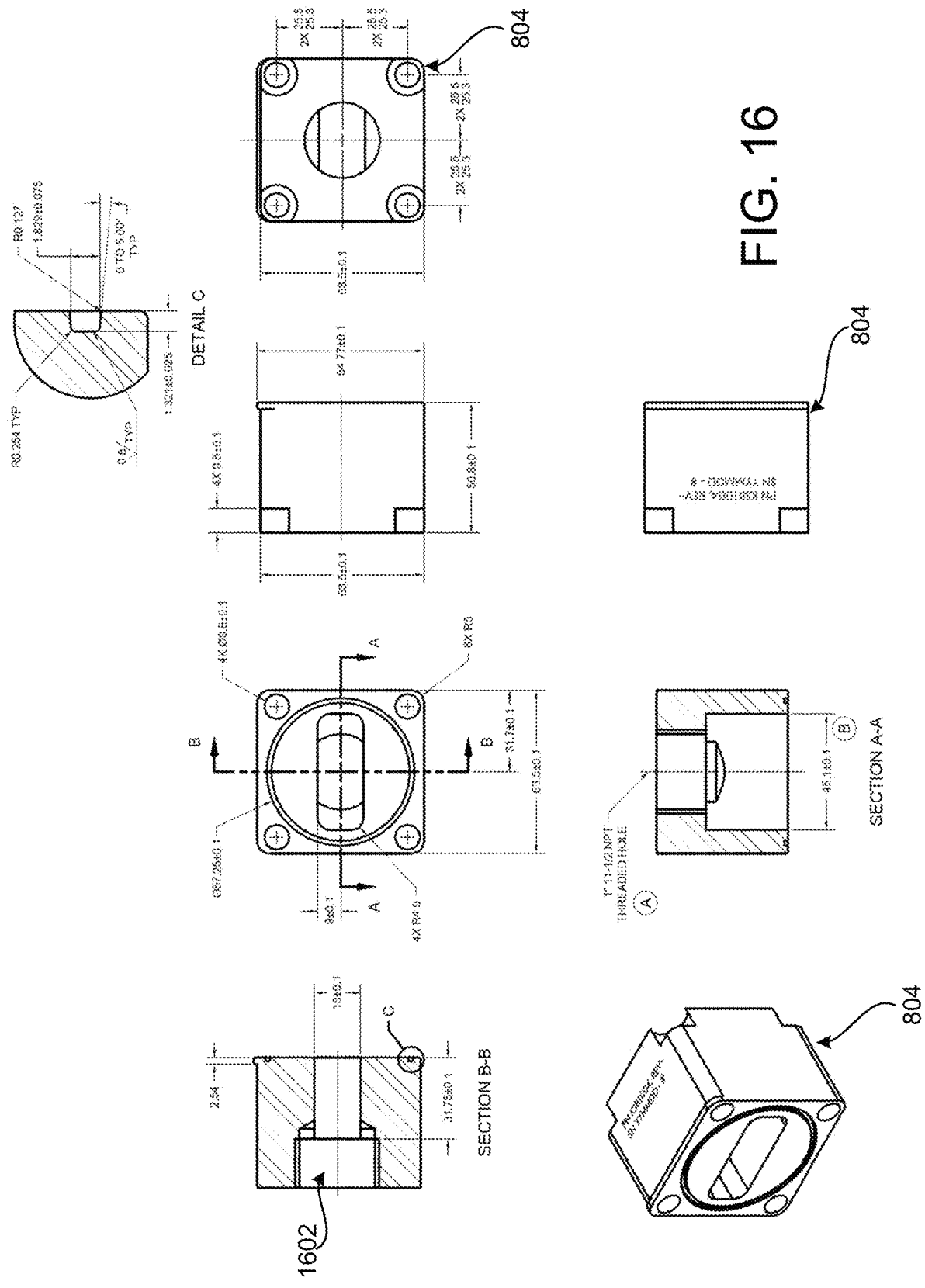

FIG. 16 shows an illustrative configuration and dimensions for the outlet adapter 804 in one particular configuration. The outlet adapter 804 can include a threaded hole 1602 for mating with a pipe connected to a destination for uncompressed output gas. The outlet adapter 804 also includes apertures therethrough for receiving screws or other types of fasteners for affixing the outlet adapter 804 to the housing 714. It is to be appreciated that the dimensions of the outlet adapter 804 shown in FIG. 16 are merely illustrative and that other dimensions can be utilized in other configurations.

Figure 18:
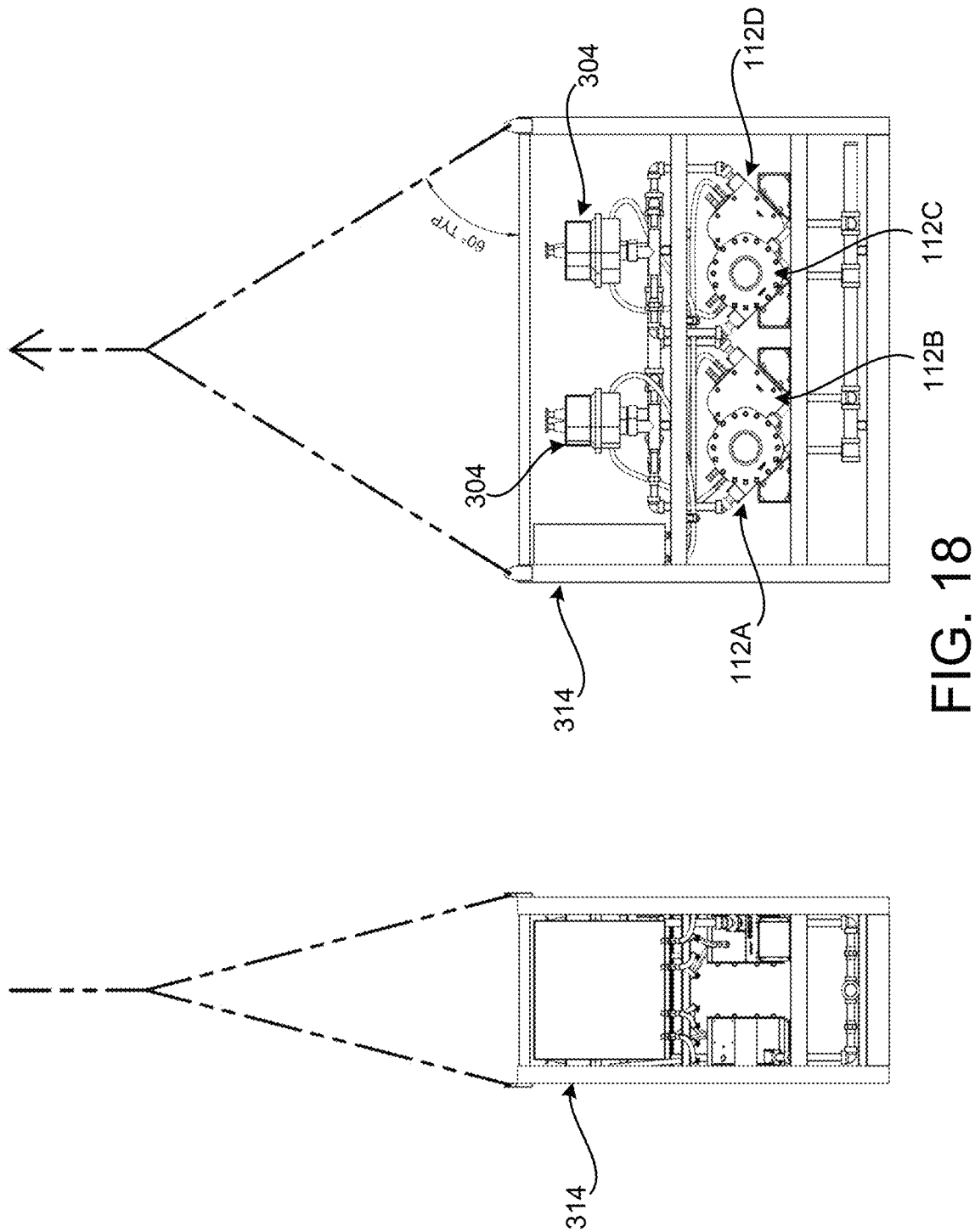
FIGS. 18 and 19 are perspective views showing aspects of a skid configured to house multiple MTEGs according to various configurations disclosed herein.
Figure 19:
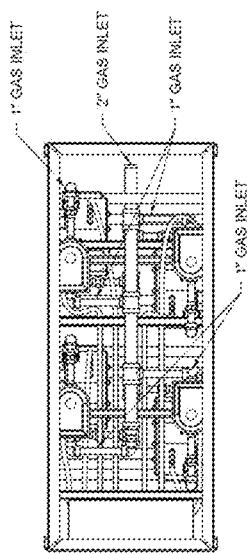
Figure 19:
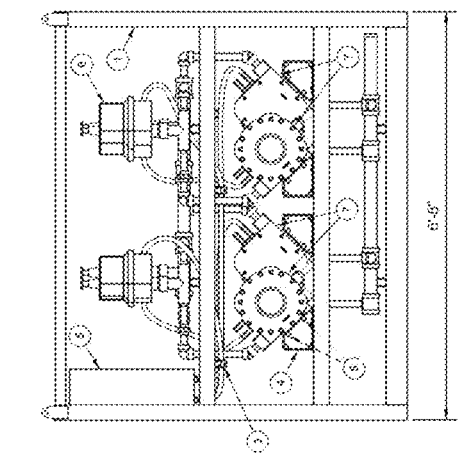
Figure 19:
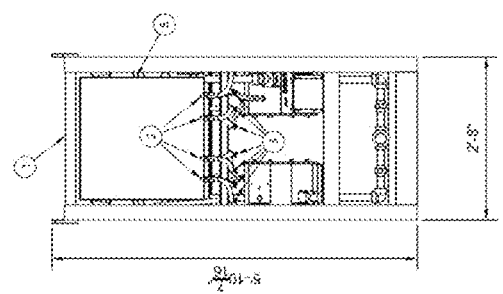
Figure 19:
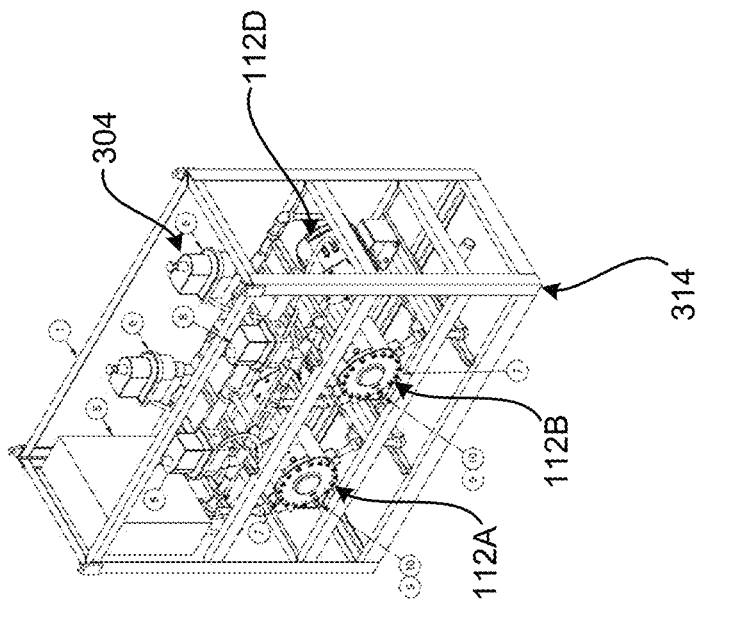
Figure 19:
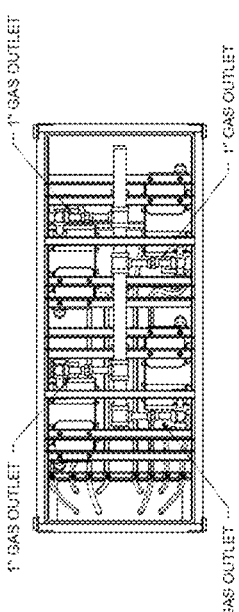

FIGS. 18 and 19 are perspective views showing aspects of a skid 314 configured to house multiple MTEGs 112 according to various configurations disclosed herein. As illustrated, the skid 314 can be configured as a volumetric rectangular structure with crossbars configured for mounting MTEGs 112 and FCVs 304. In some configurations, an enclosure 502 housing the PLC 306 can also be affixed to the skid 314. An enclosure housing the power conversion electronic 308 can also be affixed to the skid 314 in some configurations. The skid 314 might also be covered with siding to enclose the FCVs 304, MTEGs 112, and PLC 306 contained therein.

In the configurations shown in FIGS. 18 and 19, the skid 314 is equipped with four FCVs 304 and four MTEGs 112A-112D. In this regard, it is to be appreciated that the skid 314 can be configured with more or fewer FCVs 304 and MTEGS 112 in other configurations.

In the configuration shown in FIGS. 18 and 19, the MTEGs 112 are mounted in a manner that enables condensate to drain from the housing 714 through the drain 806 using the force of gravity. For example, the MTEGs 112 can be mounted such that the drain 806 is substantially facing the bottom portion of the skid 314 (i.e. the portion of the skid 314 that sits on the ground). As discussed above, the MTEGs 112 do not include a drain 806 in other configurations.

Because the skid 314 and its attached components (e.g. the MTEGs 112, the FCVs 304, piping, electrical components, etc.) form a self-contained unit for the power generation system 110 disclosed herein, the skid 314 can be easily installed on an offshore platform 100 or in another remote location while taking minimal space. It is to be appreciated that the configuration of the skid 314 shown in FIGS. 18 and 19 is merely illustrative and that other configurations can be utilized.

The disclosure presented herein also encompasses the subject matter set forth in the following clauses:

Clause 1. A power generation system, comprising: a plurality of micro-turbine electric generators (MTEGs), each of the MTEGs comprising a housing having an inlet to a first cavity of the housing for receiving a pressurized gas from a lift gas system and an outlet from the first cavity for releasing expanded gas to the lift gas system, a rotor comprising a plurality of blades, a removable nozzle for directing the pressurized gas received from the lift gas system over the blades of the rotor to cause the rotor to rotate, and a stator for generating alternating current (AC) power responsive to rotation of the rotor; and a programmable logic controller (PLC) configured to operate flow control valves (FCVs) coupled to the inlets of the MTEGs to modulate a flow of the pressurized gas to the plurality of MTEGs.

Clause 2. The power generation system of clause 1, wherein the removable nozzle comprises a plurality of channels, each of the channels comprising a converging portion and a diverging portion.

Clause 3. The power generation system of any of clauses 1 or 2, wherein the housing forms a second cavity connected to the first cavity by way of one or more passthroughs, and wherein the second cavity houses electronics for converting the AC to direct current (DC).

Clause 4. The power generation system of any of clauses 1-3, further comprising a housing encasing the PLC and electronics for converting the AC to direct current (DC).

Clause 5. The power generation system of any of clauses 1-4, further comprising instrumentation circuitry for monitoring parameters describing aspects of the operation of the electronics for converting the AC to DC.

Clause 6. The power generation system of any of clauses 1-5, wherein the PLC operates the FCVs to cause the MTEGs to generate an amount of output power for supporting an electrical load.

Clause 7. The power generation system of any of clauses 1-6, further comprising a skid mounting the plurality of MTEGs, the FCVs, and a housing encasing the PLC.

Clause 8. The power generation system of any of clauses 1-7, wherein the housing forms a second cavity connected to the first cavity by way of one or more passthroughs, and wherein the second cavity encases instrumentation circuitry for monitoring parameters describing aspects of the operation of an MTEG.

Clause 9. The power generation system of any of clauses 1-8, wherein the parameters describe one or more of the pressure of gas into and out of an MTEG, revolutions per minute (RPM) of the rotor, temperature of an MTEG, temperature of the pressurized gas, an amount of the AC power, an amount of DC output by the power generation system to an electrical load, or a temperature of power conversion electronics configured for converting the AC to direct current (DC).

Clause 10. The power generation system of any of clauses 1-9, further comprising an inlet adapter for adapting a pipe carrying the pressurized gas from the lift gas system to the inlet.

Clause 11. The power generation system of any of clauses 1-10, further comprising an outlet adapter for adapting the outlet to a pipe carrying gas output from the MTEG to the lift gas system.

Clause 12. The power generation system of any of clauses 1-11, wherein the rotor has 29 blades.

Clause 13. A power generation system, comprising: a plurality of turbines, each of the turbines comprising a housing having an inlet for receiving a pressurized gas and an outlet for releasing expanded gas, a rotor comprising a plurality of blades, a removable nozzle for directing the pressurized gas over blades of the rotor to cause the rotor to rotate, and a stator for generating alternating current (AC) responsive to rotation of the rotor; a programmable logic controller (PLC) configured to operate flow control valves (FCVs) coupled to the inlets of the turbines to modulate a flow of the pressurized gas to the plurality of turbines to generate an amount of output power from the plurality of turbines to support an electrical load; and power conversion circuitry configured to convert the AC generated by the turbines to direct current (DC) and to provide the DC to the electrical load Clause 14. The power generation system of clause 13, wherein the pressurized gas is received at the inlet from a lift gas system and wherein gas output from the output is provided to the lift gas system.

Clause 15. The power generation system of any of clauses 13 or 14, wherein the housing encases power conversion circuitry for converting the AC to direct current (DC).

Clause 16. The power generation system of any of clauses 13-15, further comprising a housing encasing the PLC and wherein the housing encasing the PLC further encases power conversion circuitry for converting the AC to direct current (DC).

Clause 17. The power generation system of any of clauses 13-16, wherein the housing further encases instrumentation circuitry for monitoring parameters describing aspects of the operation of a turbine.

Clause 18. A power generation system, comprising: a plurality of turbines configured for generating power responsive to the rotation of a rotor caused by expansion of pressurized gas over blades of the rotor; and a programmable logic controller (PLC), the PLC configured to operate flow control valves (FCVs) coupled to inlets of the plurality turbines to modulate a flow of the pressurized gas to the turbines to cause an amount of output power from the plurality of turbines to support an electrical load.

Clause 19. The power generation system of clause 18, wherein each of the one or more turbines comprises a housing having an inlet configured for receiving the pressurized gas, an outlet configured for releasing expanded gas, and a removable nozzle for directing the pressurized gas over the blades of the rotor.

Clause 20. The power generation system of any of clauses 18 or 19, wherein the pressurized gas comprises lift gas.

Clause 21. A rotor comprising: a rotor body; and a plurality of rotor blades, each of the rotor blades comprising: a connection end adjacent to an outer surface of the rotor body; a distal end spaced apart from the outer surface of the rotor body; an outer surface between the connection end and the distal end, the outer surface having a radius between 12 mm and 13 mm; and an inner surface between the connection end and the distal end, the inner surface having a radius between 10 mm and 11 mm.

Clause 22. The rotor of clause 21, wherein the outer surface has a radius of approximately 12.292 mm.

Clause 23. The rotor of any of clauses 21 or 22, wherein the inner surface has a radius of approximately 10.371 mm.

Clause 24. The rotor of any of clauses 21-23, wherein the distal end has a radius between approximately 1 and approximately 2 mm.

Clause 25. The rotor of any of clauses 21-24, wherein the distal end has a radius of approximately 1.125 mm.

Clause 26. The rotor of any of clauses 21-25, wherein a distance between the distal end and the rotor body is between approximately 10 mm and approximately 11 mm.

Clause 27. The rotor of any of clauses 21-26, wherein the distance between the distal end and the rotor body is approximately 10.84 mm.

Clause 28. The rotor of any of clauses 21-27, wherein the plurality of rotor blades comprise 29 rotor blades.

Clause 29. The rotor of any of clauses 21-28, wherein a diameter of the rotor is approximately 227.35 mm.

Clause 30. A nozzle, comprising a first material defining a plurality of circular channels therethrough, the channels comprising a converging portion, the converging portion converging from a radius of approximately 3.25 mm at a first end to a radius of approximately 1.65 mm at a second end, a diverging portion, the diverging portion diverging from a radius of approximately 1.65 mm at a first end to a radius of approximately 2.134 mm at a second end, and a nozzle throat adjacent to the second end of the converging portion and the first end of the diverging portion.

Clause 31. The nozzle of clause 30, wherein the converging portion is approximately 14.47 mm long.

Clause 32. The nozzle of any of clauses 30 or 31, wherein the nozzle throat is approximately 2.5 mm long.

Clause 33. The nozzle of any of clauses 30-32 having four channels.

Clause 34. A turbine, comprising: a rotor comprising a rotor body and a plurality of rotor blades, each of the rotor blades comprising a connection end adjacent to an outer surface of the rotor body, a distal end spaced apart from the outer surface of the rotor body, an outer surface between the connection end and the distal end, the outer surface having a radius between 12 mm and 13 mm, and an inner surface between the connection end and the distal end, the inner surface having a radius between 10 mm and 11 mm; and a nozzle, comprising a first material defining a plurality of circular channels therethrough, the channels comprising a converging portion, the converging portion converging from a radius of approximately 3.25 mm at a first end to a radius of approximately 1.65 mm at a second end, a diverging portion, the diverging portion diverging from a radius of approximately 1.65 mm at a first end to a radius of approximately 2.134 mm at a second end, and a nozzle throat adjacent to the second end of the converging portion and the first end of the diverging portion.

Clause 35. The turbine of clause 34, wherein the outer surface has a radius of approximately 12.292 mm.

Clause 36. The turbine of any of clauses 34 or 35, wherein the inner surface has a radius of approximately 10.371 mm.

Clause 37. The turbine of any of clauses 34-36, wherein the distal end has a radius between approximately 1 and 2 approximately mm.

Clause 38. The turbine of any of clauses 34-37, wherein the distal end has a radius of approximately 1.125 mm.

Clause 39. The turbine of any of clauses 34-38, wherein a distance between the distal end and the rotor body is between approximately 10 mm and approximately 11 mm.

Clause 40. The turbine of any of clauses 34-39, wherein the distance between the distal end and the rotor body is approximately 10.84 mm.

Clause 41. The turbine of any of clauses 34-40 having 29 rotor blades.

Clause 42. The turbine of any of clauses 34-41, wherein a diameter of the rotor is approximately 227 mm.

Clause 43. The turbine of any of clauses 34-42, wherein the converging portion is approximately 14.47 mm long.

Clause 44. The turbine of any of clauses 34-43, wherein the nozzle throat is approximately 2.5 mm long.

Clause 45. The nozzle of any of clauses 34-44 wherein there are four channels.

Based on the foregoing, it should be appreciated that an environmentally friendly, reliable, and scalable power generation system has been disclosed herein. It is also to be appreciated that the subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims. The invention may be embodied in other specific and unmentioned forms, apparent to the skilled artisan, without departing from the spirit or essential attributes thereof, and it is therefore asserted that the foregoing embodiments are in all respects illustrative and not to be construed as limiting.

References to relative terms such as upper and lower, front and back, left and right, or the like, are intended for convenience of description and are not contemplated to limit the technologies disclosed herein, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved power generation systems and methods for making and using the same. Therefore, combinations of features and methods disclosed herein may not be necessary to practice the invention in its broadest sense and are instead disclosed merely to particularly describe representative and preferred embodiments of the instant invention.

What is claimed is:

1. A power generation system configured for operation on an offshore oil platform, the offshore oil platform comprising a lift gas system configured to generate compressed lift gas, the power generation system comprising:
    a plurality of micro-turbine electric generators (MTEGs), each of the MTEGs comprising
        a housing having an inlet to a first cavity of the housing for receiving the compressed lift gas from the lift gas system on the offshore oil platform and an outlet from the first cavity for releasing expanded lift gas to the lift gas system,
        a rotor comprising a plurality of blades,
        a removable nozzle for directing the compressed lift gas received from the lift gas system over the blades of the rotor to cause the rotor to rotate, and
        a stator for generating alternating current (AC) power responsive to rotation of the rotor;
    a plurality of flow control valves (FCVs), individual ones of the plurality of FCVs coupled to the lift gas system and an inlet of individual ones of the plurality of MTEGs; and
    a programmable logic controller (PLC) configured to
        recognize changes to an electrical load, and
        adjust the individual ones of the plurality of FVCs coupled to the inlets of the individual ones of the plurality of MTEGs to modulate a flow of the compressed lift gas from the lift gas system to the plurality of MTEGs such that a power output of the plurality of MTEGs matches the electrical load.

2. The power generation system of claim 1, wherein the removable nozzle comprises a plurality of channels, each of the channels comprising a converging portion and a diverging portion.

3. The power generation system of claim 1, wherein the housing forms a second cavity connected to the first cavity by way of one or more passthroughs, and wherein the second cavity houses electronics for converting the AC to direct current (DC).

4. The power generation system of claim 1, further comprising a housing encasing the PLC and electronics for converting the AC to direct current (DC).

5. The power generation system of claim 4, further comprising instrumentation circuitry for monitoring parameters describing aspects of the operation of the electronics for converting the AC to DC.

6. The power generation system of claim 1, further comprising a skid mounting the plurality of MTEGs, the FCVs, and a housing encasing the PLC.

7. The power generation system of claim 1, wherein the housing forms a second cavity connected to the first cavity by way of one or more passthroughs, and wherein the second cavity encases instrumentation circuitry for monitoring parameters describing aspects of the operation of an MTEG.

8. The power generation system of claim 7, wherein the parameters describe one or more of the pressure of gas into and out of an MTEG, revolutions per minute (RPM) of the rotor, temperature of an MTEG, temperature of the compressed lift gas, an amount of the AC power, an amount of DC output by the power generation system to an electrical load, or a temperature of power conversion electronics configured for converting the AC to direct current (DC).

9. The power generation system of claim 1, further comprising an inlet adapter for adapting a pipe carrying the compressed lift gas from the lift gas system to the inlet.

10. The power generation system of claim 1, further comprising an outlet adapter for adapting the outlet to a pipe carrying gas output from the MTEG to the lift gas system.

11. The power generation system of claim 1, wherein the rotor has 29 blades.

12. A power generation system configured for operation on an offshore oil platform, the offshore oil platform comprising a lift gas system configured to generate compressed lift gas, the power generation system comprising:
- a plurality of turbines, each of the turbines comprising
  - a housing having an inlet for receiving compressed lift gas from the lift gas system on the offshore oil platform and an outlet for releasing expanded lift gas to the lift gas system,
  - a rotor comprising a plurality of blades,
  - a removable nozzle for directing the compressed lift gas over blades of the rotor to cause the rotor to rotate, and
  - a stator for generating alternating current (AC) responsive to rotation of the rotor;
- a programmable logic controller (PLC) configured to operate a plurality of flow control valves (FCVs) coupled to the inlets of individual ones of the plurality of turbines to modulate a flow of the compressed lift gas from the lift gas system to the plurality of turbines to generate an amount of output power from the plurality of turbines that matches an electrical load; and
- power conversion circuitry configured to convert the AC generated by the turbines to direct current (DC) and to provide the DC to the electrical load.

13. The power generation system of claim 12, wherein the housing encases the power conversion circuitry.

14. The power generation system of claim 12, further comprising a housing encasing the PLC and wherein the housing encasing the PLC further encases the power conversion circuitry.

15. The power generation system of claim 12, wherein the housing further encases instrumentation circuitry for monitoring parameters describing aspects of the operation of a turbine.

16. A power generation system configured for operation on an offshore oil platform, the offshore oil platform comprising a lift gas system configured to generate compressed lift gas, the power generation system comprising:
- a plurality of turbines configured for generating power responsive to the rotation of a rotor caused by expansion of the compressed lift gas generated by the lift gas system on the offshore oil platform over blades of the rotor, the plurality of turbines comprising a removable nozzle for directing the compressed lift gas received from the lift gas system over blades of the rotor to cause the rotor to rotate;
- a plurality of flow control valves (FCVs), individual ones of the plurality of FCVs coupled to the lift gas system and an inlet of individual ones of the plurality of turbines; and
- a programmable logic controller (PLC), the PLC configured to
  - recognize changes to an electrical load, and
  - adjust individual ones of the FCVs coupled to the inlets of the plurality of turbines to modulate a flow of the compressed lift gas to the turbines to cause the plurality of turbines to generate an amount of power matching the electrical load.

17. The power generation system of claim 16, wherein each of the one or more turbines comprises a housing the inlet configured for receiving the compressed lift gas, an outlet configured for releasing expanded lift gas to the lift gas system, and a removable nozzle for directing the compressed lift gas over the blades of the rotor.

* * * * *